US011167709B2

(12) United States Patent
Temple

(10) Patent No.: US 11,167,709 B2
(45) Date of Patent: Nov. 9, 2021

(54) EXTENDABLE VEHICLE BUMPER

(71) Applicant: Will John Temple, Placerville, CA (US)

(72) Inventor: Will John Temple, Placerville, CA (US)

( * ) Notice: Subject to any disclaimer, the term of this patent is extended or adjusted under 35 U.S.C. 154(b) by 0 days.

(21) Appl. No.: 16/012,665

(22) Filed: Jun. 19, 2018

(65) Prior Publication Data
US 2019/0225171 A1 Jul. 25, 2019

Related U.S. Application Data

(60) Provisional application No. 62/620,089, filed on Jan. 22, 2018.

(51) Int. Cl.
B60R 19/40 (2006.01)
B60R 21/0132 (2006.01)
B60R 21/0134 (2006.01)
B60R 21/34 (2011.01)

(52) U.S. Cl.
CPC .......... *B60R 19/40* (2013.01); *B60R 21/0132* (2013.01); *B60R 21/0134* (2013.01); *B60R 21/34* (2013.01); *B60R 2021/346* (2013.01)

(58) Field of Classification Search
CPC .. B60R 19/40; B60R 21/0132; B60R 21/0134
USPC ...................... 293/4, 118, 119, 24
See application file for complete search history.

(56) References Cited

U.S. PATENT DOCUMENTS 1,918,697 A    10/1928  Gruss
1,967,641 A     6/1931  Wallace
3,346,292 A *  10/1967  Lundman ............... B60R 19/40
                                                    293/9
3,729,221 A *   4/1973  Granig .................. B60R 19/40
                                                    293/9
3,853,199 A *  12/1974  Hirashima ........... H01H 35/146
                                                    180/274
3,947,061 A *   3/1976  Ellis ..................... B60R 19/40
                                                    293/5
4,474,257 A *  10/1984  Lee ...................... B60R 19/40
                                                    180/271
5,959,552 A     9/1999  Cho
5,967,573 A *  10/1999  Wang ................... B60R 19/40
                                                    293/118
6,217,090 B1*   4/2001  Berzinji ................ B60R 19/28
                                                    293/106
6,709,035 B1*   3/2004  Namuduri ............ B60R 19/40
                                                    293/118
6,893,079 B1*   5/2005  Johnson ............... B60R 19/40
                                                    293/114
8,041,483 B2   10/2011  Breed
9,802,568 B1   10/2017  Larner
(Continued)

OTHER PUBLICATIONS

Michael Lamm, Hornet hatchback leads the way, Oct. 1972, 118-119, Popular Mechanics, USA.

*Primary Examiner* — Jason S Morrow

(57) ABSTRACT

An improved bumper system for transportation vehicles (10) comprising one or more extendable bumpers (12, 14-15). The extendable bumpers extend substantially outward from a vehicle to provide a greater distance with which to reduce the forces acting upon the occupants and/or cargo of a transportation vehicle in the event of a collision. In some embodiments, the extendable bumpers extend in response to a detected, possible, or likely collision.

25 Claims, 12 Drawing Sheets

(56) References Cited

U.S. PATENT DOCUMENTS

| | | | | |
|---|---|---|---|---|
| 10,086,787 | B1* | 10/2018 | Akhlaque-e-rasul | ... B60R 21/13 |
| 2004/0032132 | A1* | 2/2004 | Yang | ........................ B60R 19/38 |
| | | | | 293/118 |
| 2006/0087132 | A1* | 4/2006 | Tanabe | .................. B60R 21/013 |
| | | | | 293/4 |
| 2007/0290515 | A1* | 12/2007 | Doan | ...................... B60R 19/38 |
| | | | | 293/119 |
| 2015/0202939 | A1* | 7/2015 | Stettner | .................... B60R 1/00 |
| | | | | 701/37 |
| 2020/0172041 | A1* | 6/2020 | Dix | ........................ B60R 19/40 |

\* cited by examiner

FIG 8B — 101

- Processor(s) — 200
- Port(s) — 201
- Data — 202
- Memory — 203
- Computer Readable Medium — 204
- Computer Recordable Medium — 205
- Data Storage(s) — 206
- Instructions — 207
- Display(s) — 208
- User Interface(s) — 209
- Speaker(s) — 210
- Microphone(s) — 211
- Touch Screen(s) — 212
- Wireless Communication System(s) — 213
- Software — 214

FIG 8A — 10

- Sensor(s) — 100
- Computing Device(s) — 101
- Signal(s) — 106
- Communication System(s) — 213
- Perception System(s) — 280

FIG 8D — 213

- V2X — 270
- V2V — 271
- V2I — 272
- V2P — 273
- V2G — 274
- V2D — 302
- GPS — 256
- Navigation System — 275
- WiFi — 276
- NFC — 277
- LAN — 278
- WAN — 279
- IP — 299

FIG 8C — 100

- Camera(s) — 250
- Lidar — 251
- Radar — 252
- Accelerometer(s) — 253
- Gyroscope(s) — 254
- Compass(es) — 255
- GPS — 256
- Proximity(ies) — 257
- Echolocation — 258
- Temperature — 259
- Sensor Fusion Algorithm(s) — 260
- Pressure — 260

FIG 8E — 280

- Sensor(s) — 100
- Computing Device(s) — 101
- Communications System(s) —

FIG 8F — 106

- Signal to Extend — 301
- Signal to Retract — 302
- End of Event Signal — 304

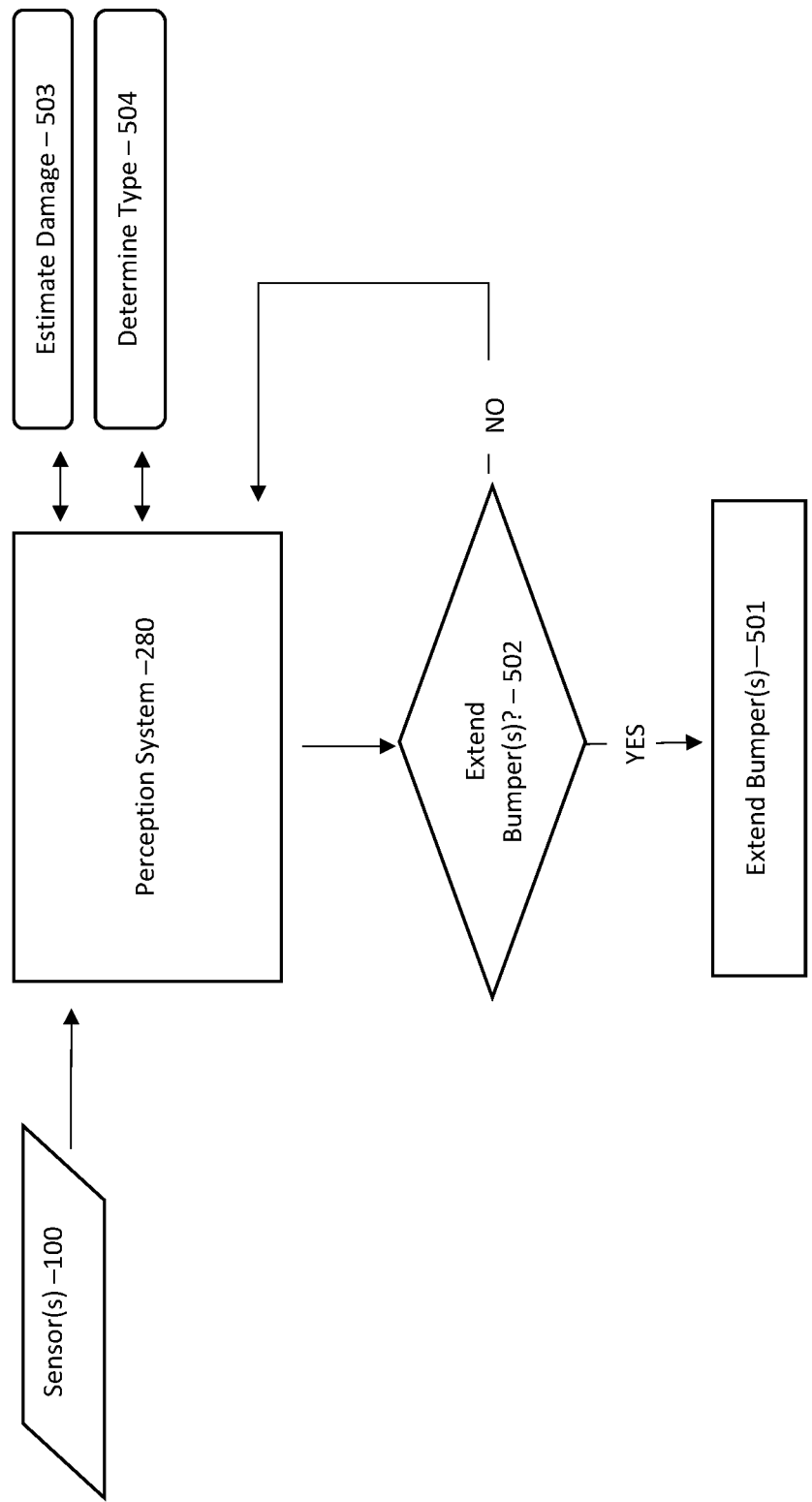

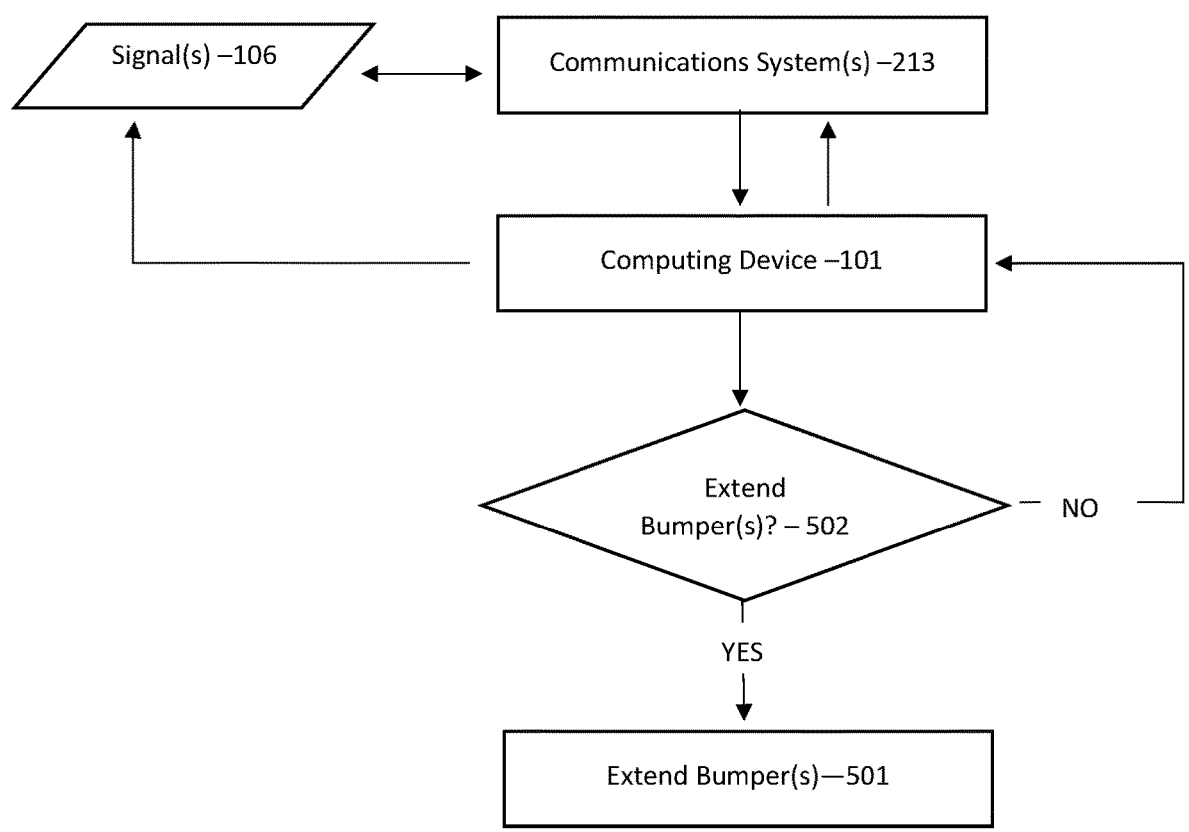

EXTENDABLE VEHICLE BUMPER

CROSS-REFERENCE TO RELATED APPLICATIONS

This application claims the benefit of PPA Ser. Nr. 62/620,089 filed 2018 Jan. 22 by the present inventor, which is incorporated by reference.

BACKGROUND-FIELD OF INVENTION

The disclosed embodiments relate generally to transportation vehicles and reducing forces resulting from collisions with other objects.

BACKGROUND-DESCRIPTION OF PRIOR ART

Transportation vehicles sometimes collide with other objects which may result in damage to the vehicle, its occupants, and cargo. Currently most transportation vehicles have a front and rear bumper to handle collisions at low speed. However, they only have a small amount of travel within which to decelerate the vehicle to reduced damage caused by the collision.

Transportation vehicles, by and large, do not extend outward in response to an imminent collision to decelerate the vehicle over a greater distance than a conventional and commercially acceptable bumper provides. What is needed is a bumper, or other mechanism, to reach outward to decelerate the vehicle over a greater distance than a common bumper provides in the event of a collision.

One solution comprising externally deployed airbags have been suggested by Carl Clark and William Young in SAE paper "941051 Airbag Bumpers", 1994 Society of Automotive Engineers. Clark and Young demonstrated the concept of pre-inflating the airbag for frontal impacts. Further, patent disclosure Pat. No. 9,802,568 to inventor Daniel Lynn Larner (Oct. 31, 2017) discloses external interlocking airbags for greater protection.

Typically, airbag systems are deployed to protect passengers from impacts with the interior of a vehicle after an object external to a vehicle has impacted the vehicle. However, external airbags may employ a perception system using a computing device and one or more processors, and using data from one or more sensors to determine that an impact with an object is likely to occur within a predetermined period of time; and using, by the one or more processors, the determination to send a signal in order to deploy the airbags.

This solution generally has a greater cost than that of a common internal airbag system due to the extra cost of the perception system and processing. Further, once the airbags are deployed, they do not automatically return and/or retract to a reusable state. Further, airbags may be punctured by sharp objects. Further, an external airbag system may be of too high a cost to be accepted by a high number of worldwide transportation vehicle manufactures. Further, airbags generally rely on pyrotechnics to inflate the bags very quickly. This can lead to problems, such as with Takata airbags exploding, and pyrotechnics also raise the cost. Further, fires may explode airbags due to the pyrotechnics, and they may also inadvertently deploy. The external airbag idea dates back to at least the 1990's, and yet has not found acceptance in current vehicles.

Further regarding airbags, they are generally used to protect front passengers. However, children may be harmed by them, and children under a certain height and/or weight and/or age are generally not allowed to be placed in seats with active airbags. Children generally are placed in the rear seats where there is generally not much distance in which to decelerate a child in a collision. Child seats often have straps to limit the forward travel of the seat and forward incursion of the child in a collision to prevent the child's head from contacting the front seat. However, this limits the travel and distance with which to decelerate the child, raising child fatalities. So, the solution to one problem creates another. This is apparently not a recognized problem. Further, if the front seats are allowed to travel significantly farther forward to increase deceleration distance, then the front passengers are put at risk. I have recognized that the solution to these problems lies in decelerating the entire vehicle over a greater distance than is currently available. This solution better protects all passengers, even if they are in a colliding vehicle.

In a related field, active hoods have been disclosed for the use of pedestrian safety, as in US patent application 20150000994 to William McLundie. However, these systems are not for the use of protecting the vehicle, its occupants, and/or cargo, and are generally exclusive to protecting pedestrians.

Another solution to providing a greater distance with which to decelerate a vehicle is to provide a bumper longer than a common bumper. This has been tried by Volvo decades ago in the 1972 Volvo VESC. However, a longer bumper interferes with the overall length of the vehicle, which for one interferes with parking the vehicle. It also changes the aesthetics, as well as other factors, such as increasing the polar moment of inertia of the vehicle. Further, long bumpers, or even bumpers extended may interfere with the aerodynamics of the vehicle. This was not a commercially viable result, and is thus, not a common automotive bumper.

Further, Train buffers comprise embodiments also used to decelerate a vehicle over a distance—reducing the peak force of deceleration and damage. However, train buffers do not significantly extend forward in the event of a likely collision and are generally equivalent to a common automotive bumper system.

What is needed is an extendable bumper system that can decelerate a vehicle over a greater distance than common bumpers and methods in the event of a collision. The solution will in some events be reusable. Also, the solution will allow the vehicle to continue to be used after some collision events. Preferably, the solution will allow the vehicle to continue to be used after more collision events than will a common bumper system.

BRIEF DESCRIPTION OF THE DRAWINGS

For a better understanding of the embodiments of the invention, as well as additional embodiments thereof, reference should be made to the Description of Embodiments below, in conjunction with the following drawings, in which like reference numerals refer to corresponding parts throughout the figures.

FIG. 8A illustrates a vehicle comprising a plurality of elements in accordance with some embodiments.

FIG. 8B illustrates a computing device comprising a plurality of elements in accordance with some embodiments.

FIG. 8C illustrates sensors in accordance with some embodiments.

FIG. 8D illustrates a communications system in accordance with some embodiments.

FIG. 8E illustrates a perception system in accordance with some embodiments.

FIG. 8F illustrates signals of a communications system in accordance with some embodiments.

FIG. 10C illustrates a flowchart in accordance with some methods of the invention.

FIG. 10D illustrates a flowchart in accordance with some methods of the invention.

REFERENCE NUMERALS IN DRAWINGS

Figure 1A:
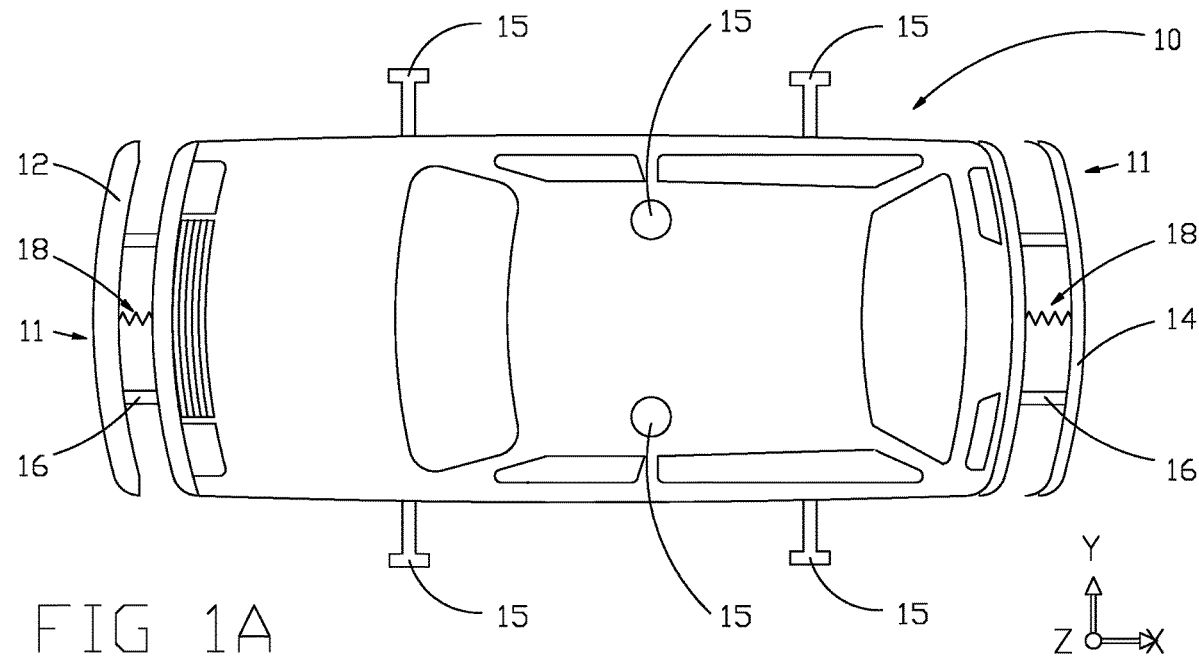
FIG. 1A illustrates a top view of a transportation vehicle in accordance with some embodiments.

10 Transportation Vehicle (Comprising chassis, body, common vehicle components, front, back, sides, and roof)
11 Extendable Bumper Assembly
12 Extendable Bumper
14 Extendable Bumper
15 Extendable Bumper
16 Extendable Member
17 Chassis/Frame
18 Spring
40 Slider
41 Stanchion
42 First Chamber
43 Second Chamber
44 Hole(s)
45 Valve(s)
46 Piston
47 Piston Seal(s)
48 Passage
49 Mount(s)
50 Slider
51 Stanchion
52 Pivot
53 Slide-able Member
54 Slide-able Member
55 Arm
56 Arm
61 Tank
62 Tank Valve
100 Sensor(s)
101 Computing Device(s)
103 Compressor(s)
104 Filter(s)
105 Ducting/Hose(s)
106 Signals(s)
107 Actuator(s)
110 Pump(s)
112 Sphere(s)/Chamber
114 Gas
116 Hydraulic Fluid
118 Valve
120 Coil
200 Processor(s)
201 Port(s)
202 Data
203 Memory
204 Computer Readable Medium
205 Computer Recordable Medium
206 Data Storage(s)
207 Instructions
208 Display(s)
209 User Interface(s)
210 Speaker(s)
211 Microphone(s)
212 Touch Screen(s)
213 Wireless Communication System(s)
214 Software
250 Camera(s)
251 Lidar
252 Radar
253 Accelerometer(s)
254 Gyroscope(s)
255 Compass(es)
256 GPS
257 Proximity(ies)
258 Echolocation
259 Temperature
260 Sensor Fusion Algorithm(s)
261 Pressure
262 Position(s)
270 V2X
271 V2V
272 V2I
273 V2P
274 V2G
275 Navigation System
276 WiFi
277 NFC
278 LAN
279 WAN 299 IP
280 Perception System(s)
300 Signal to Extend
301 Signal to Retract
302 V2D
304 End of Event Signal
305 Body (Comprising Chassis)
500 Deceleration Force
501 Linear Momentum
502 Extend Bumper(s)?
503 Estimate Damage
504 Determine Type

DETAILED DESCRIPTION OF THE
EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known and/or common processes, mechanisms, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms may only be used to distinguish one element from another. For example, a first member could be termed a second member, and, similarly, a second member could be termed a first member, without departing from the scope of the present invention.

The terminology, used in the description of the invention herein, is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or", as used herein, refers to and encompasses any and all possible combinations of one or more of the associated listed items. It will be further understood that the terms "comprises" and/or "comprising," when used in this specification, specify the presence of stated features, steps, methods, operations, elements, and/or components, but do not preclude the presence or addition of one or more other features, steps, methods, operations, elements, and/or components thereof.

Embodiments of a transportation vehicle, and associated processes for using such devices are described. In some embodiments, the transportation vehicle is an automobile, a truck, a bus, an autonomous vehicle, or any vehicle for transporting people or cargo. It should be understood, however, that some of the extending bumper embodiments may be applied to other devices, such as, but not limited to, trains, trollies, boats, airplanes, sports equipment, etc. For example, a helmet could comprise extendable bumpers to limit the impact forces to the head of a wearer.

In the examples about to be disclosed, the extendable bumper embodiments are attached or built into an automobile.

For simplicity, the term "bumper" will represent any physical structure providing a rigid, or semi-rigid surface that will generally be the first surface to be contacted by an external object in a collision. For example, but not limited to the example, if the transportation vehicle collides with a second vehicle, the bumper is designed and intended to be the first surface that contacts the second vehicle. However, a wide variety of different collisions exist, and a bumper is not guaranteed to be the first surface to make contact. During a collision, impact forces are imparted and the term "impact" is sometimes used to refer to a collision between two objects or to refer to the impact one object has on another.

In an aspect of extendable bumpers, an extendable bumper may also comprise other functions and elements. For example, an extendable bumper system may comprise and/or extend grills, fascia, license plate holders, trailer hitches, tow hooks, headlights, taillights, turn signals, etc.

The term "extendable member" represents one or more parts or an assembly of parts or elements that extend the bumper. In an embodiment, the extendable member 16 (FIG. 4A) comprises a telescoping strut, which comprises a chamber 42 & 43 and a piston 46. The chamber is commonly a cylinder and round in cross section, but may be a different shape, such as having an oval cross section or box cross section. The chamber may be a stanchion 41, and a slider 40 may comprise the piston. In an aspect of some embodiments, the part that slides relative to the chassis 17 and body 305 (FIG. 7) of the vehicle 10 comprises the chamber. The terms stanchion and slider are sometimes relative, depending of what element slides relative to what. In this embodiment, the "slider" comprises the piston, as this element slides relative to the body. Further, transportation vehicles commonly comprise bodies, chassis, and/or a frame.

Generally, all parts of common vehicles accelerate and decelerate at the same rates. However, the extendable bumpers of the present invention may not, so the terms "body, "chassis", and "frame" are generally differentiated from the present extendable bumpers and are what the extendable bumpers attach to in many embodiments. It is common that the term "body" refers to a body that is built on top of a chassis or frame, but in this disclosure a body may also comprise a chassis and/or frame, as well as other common vehicle components, such as propulsion systems, braking systems, transmissions, steering systems, lighting systems, doors, hoods, hatches, windshields, windows, driver and occupant interfaces, undercarriage, etc. The term chassis and even body may also refer to other terms for what provides the structure of a vehicle, such as monocoque, space frame, undercarriage, etc.

Figure 7:
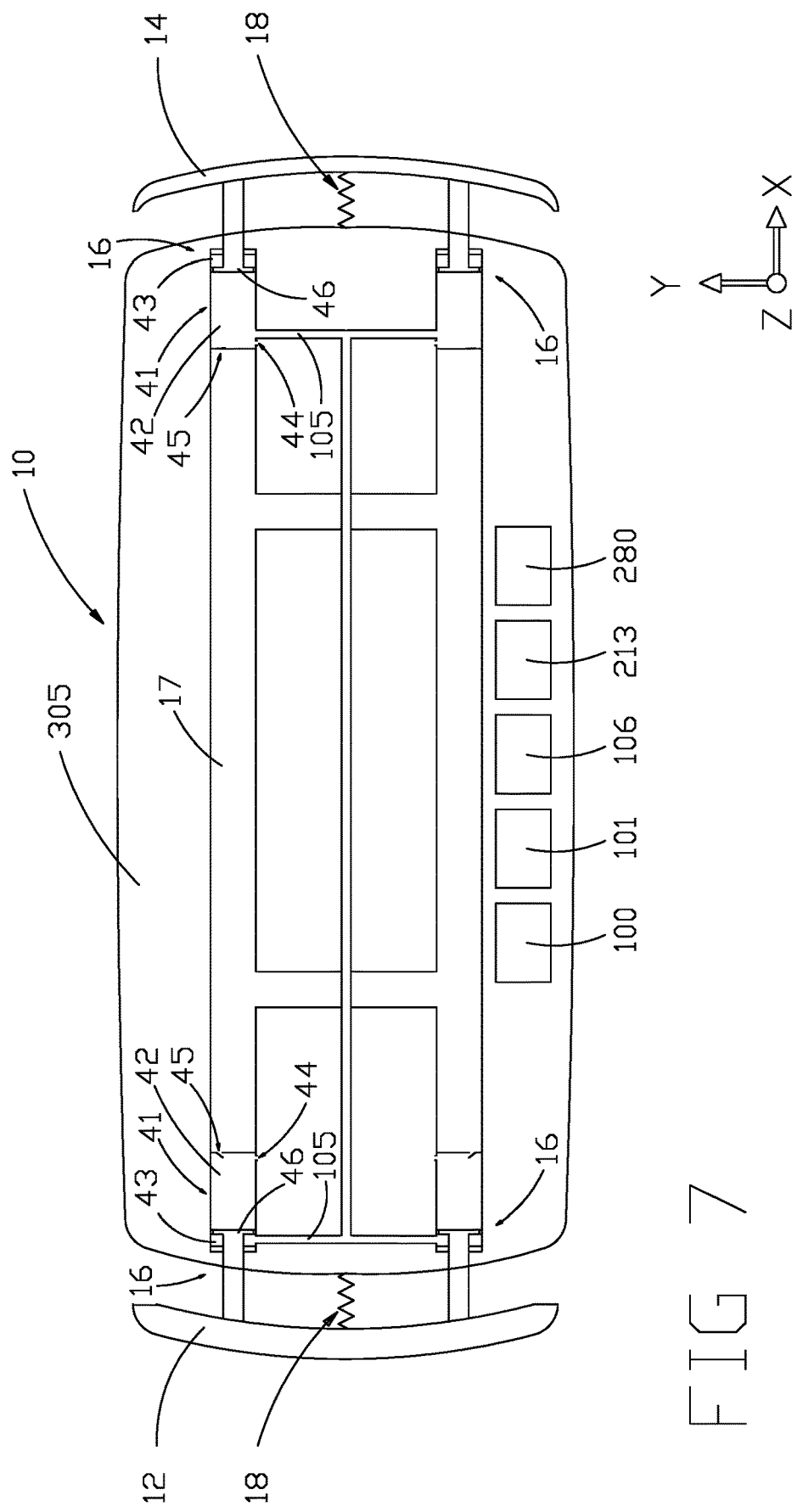
FIG. 7 illustrates a top view of an extendable bumper system overlaid on the outline of a transportation vehicle in accordance with some embodiments.

In an aspect of the invention, some elements of an extendable bumper assembly, such as a stanchion, which may comprise one or more chambers, may be built into the chassis (sometimes called the frame) 17 or body of the vehicle 305, as illustrated in FIG. 7. Elements may also be built into other common vehicle parts or components. Common automobile chassis/frames often comprise box section members and rails. A stanchion comprising one or more chambers with which gas (air) or fluid is moved and/or compressed may be built into these box section members or rails. Further, the cross-sectional shape of the box section members and rails may be modified to be circular, or another shape such as oval. Commonly, the members or rails of a chassis are hollow. Thus, a stanchion may be added to vehicle that does not require significant extra room in the vehicle, if it is built into the chassis members or rails, or other existing parts.

In an embodiment of the invention, a gas is compressed out of a chamber 42 (FIG. 7) in an extendable bumper assembly into the chassis or frame 17 of a vehicle instead of to the outside air. In an aspect of the embodiment, as long as the volume is relatively large the compression rate will not significantly rise. However, the volume does not need to be limited to a large volume and the spring rate may rise if the volume is small, which could benefit the spring rate. Further, there may be multiple volumes or chambers into which the gas may be compressed. Further, in another embodiment a plurality of chambers are available for gas to be compressed into, and valves may control the opening of these chambers. Opening and closing valves will then vary the compression force applied to the vehicle for different collision events or at different times or displacements during compression.

In an aspect of the term "compression", the term in this disclosure may sometimes refer to the compression of the extendable bumper assembly. For example, in a collision a bumper assembly may be "compressed" in length by moving a non-compressible fluid through a hole which provides a compression force, or it may be "compressed" by induction of current which provides a compression force.

In an aspect of some of the embodiments of the invention, compressing a gas into a frame or other chamber can be cleaner than compressing air to the outside, as outside air would then need to re-enter the extendable bumper assembly during extension. Further, if the system is sealed, a gas other than air can be utilized, which may not corrode parts of the assembly. In an embodiment, nitrogen is used as the working gas. In an embodiment, argon is used as the working gas. Further, the hole 44 that provides damping may also vent to the frame or another chamber, instead of to the outside air for these given reasons.

Common to many embodiments are means to sense or react to an event that indicates that a collision is likely or possible to happen. One means to sense or react to an event that a collision is likely or possible comprises detecting or responding to a deceleration force caused by the vehicle braking, or by the wheels striking a higher friction road surface, or any other deceleration of the chassis and body of the vehicle.

For this disclosure, the term "likely" when applied to a possible collision refers to determining a likelihood that the collision event is probable, eminent, or above (or equal to) a threshold value, or a possible collision has been detected. The threshold value may be a predetermined value, an average value, or a normal value, or other value. Further, the likelihood may be determined by a perception system, sensors, and/or forces, or other elements of the invention. The likelihood may also be communicated to the vehicle. Further, the term "likely" may also mean that the likelihood of a collision is greater than normal, wherein normal refers to a normal risk of a vehicle that is parked, stationary, or moving where a threat of collision has not been detected, or the threat is below a threshold value (or may be equal to a threshold value). These are lists of alternatives and individual embodiments and methods may comprise some of these elements in any combination. Further, some embodiments may exclude one or more of these values and elements.

When a vehicle brakes or decelerates, it is possible to have a collision with an external object. In an all mechanical embodiment, the embodiment cannot determine the likelihood other than by the rate of deceleration of the vehicle. Braking forces substantially near the maximum braking force (maximum deceleration of the vehicle) indicates that a collision is generally more likely than lighter braking forces.

Another means to sense an event that a collision is likely to happen comprises a perception system. Another means to sense an event that a collision is likely to happen comprises sensors. Another means to sense an event that a collision is likely to happen comprises detecting a driver activating a horn.

In an embodiment, the sensors comprise one or more accelerometers (which may be MEMS accelerometers, or other accelerometers) and a computing system. In an embodiment, acceleration above a positive threshold, or acceleration below a negative threshold indicate deceleration of the vehicle past or equal to a threshold of deceleration and the vehicle extends its bumpers in response. In an aspect of the embodiment, the acceleration (or deceleration) values may be determined from a sensor fusion algorithm which may utilize outputs from one or more accelerometers and one or more gyroscopes, and may further utilize a compass, or other position sensors, such as GPS in any combination. In an aspect of the term "deceleration", deceleration can be expressed as negative acceleration, and vice versa.

In an embodiment, bumpers are extended when a change in acceleration values are beyond or equal to a threshold value. For example, if acceleration in the Z direction suddenly changes, it could indicate that a vehicle has dropped off the side of the road, and the extendable bumpers would be extended.

In an embodiment, the sensors comprise one or more wheel-speed sensors, wherein some extendable bumpers are extended in response to a sudden decrease in wheel speed of one or more wheels, indicating the locking of one or more wheels during braking. In an embodiment, the sensors comprise one or more wheel-speed sensors, wherein some extendable bumpers are extended in response to a sudden differential in wheel speed between one or more wheels.

In an embodiment, the sensors comprise one or more brake pressure sensors, wherein some extendable bumpers are extended in response to detecting a sensor value beyond a threshold value indicating strong braking. In an aspect, common wheel speed sensors and brake pressure sensors exist, and commonly provide a computing system with speed and/or pressure signals. In an aspect, embodiments may utilize any combination of one or more sensors, or may exclude some sensors.

In an embodiment, sensors comprise a velocity sensor. In an embodiment, sensors comprise a direction sensor. In an aspect of some embodiments of the invention, sensors and sensor values can be combined to determine when to extend extendable bumpers. For example, if a computing system determines from its sensors that the vehicle has a velocity in a direction different than the vehicle is pointing, it could respond by extending its bumpers assuming the car is sliding. Likewise, if it is detected that one or more of the wheels are not spinning at the speed required for the velocity of the vehicle, the bumpers can be extended.

In an aspect of some embodiments of the invention, any sensors that trigger common airbags may be used to trigger extending extendable bumpers.

Common to many embodiments is a response to an event that one or more collisions are likely or possible to happen comprising extending one or more bumpers outward from the vehicle body to prepare for the collisions. In an aspect of some of the embodiments of the invention, the extendable bumpers comprise a plurality of positions or states comprising extended and retracted—and may further comprise one or more partially extended states. For example, a parked vehicle may extend its extendable bumpers a small amount in between fully retracted and fully extended to protect the vehicle while not taking up un-needed extra length in its parking spot. The term retracted refers to the extendable bumper when it is in its non-extended position or state. This position or state may also be considered its initial position or state in some embodiments. In this position or state, the overall length of a vehicle is generally commensurate with the length of the vehicle if it had common bumpers. Whereas, if the vehicle extends a front or rear bumper, or both, outward from the vehicle, the overall length would be greater than the vehicle if it had common bumpers, and greater than its length with both extendable bumpers retracted, as viewed in FIG. 1A, 2A. However, vehicles with extendable bumpers are not limited to having the same overall vehicle length when retracted. Provided there is sufficient room within the body, a vehicle with extendable bumpers may have a shorter overall length, and yet still provide greater (or equal to) protection than a vehicle with common bumpers.

In all figures that display an X, Y, Z axis legend, the X and Y axes define a plane in the plane of the ground, or any surface the vehicle is on. The Z axis is defined as perpendicular to the ground and the positive Z direction extends upwards from the ground.

FIG. 1A is a top view illustrating a transportation vehicle 10 comprising extendable bumpers 12, 14-15 in accordance with some embodiments. The figure illustrates a plurality of extendable bumpers to illustrate extendable bumpers at the front, back, and sides of the vehicle. However, a vehicle of some of the embodiments of the present invention may comprise one or more extendable bumpers in any combination, though some embodiments may exclude some bumpers. Further, extendable bumpers may be added to other surfaces, such as the roof 15. In this view, the extendable bumpers are extended.

Figure 2A:
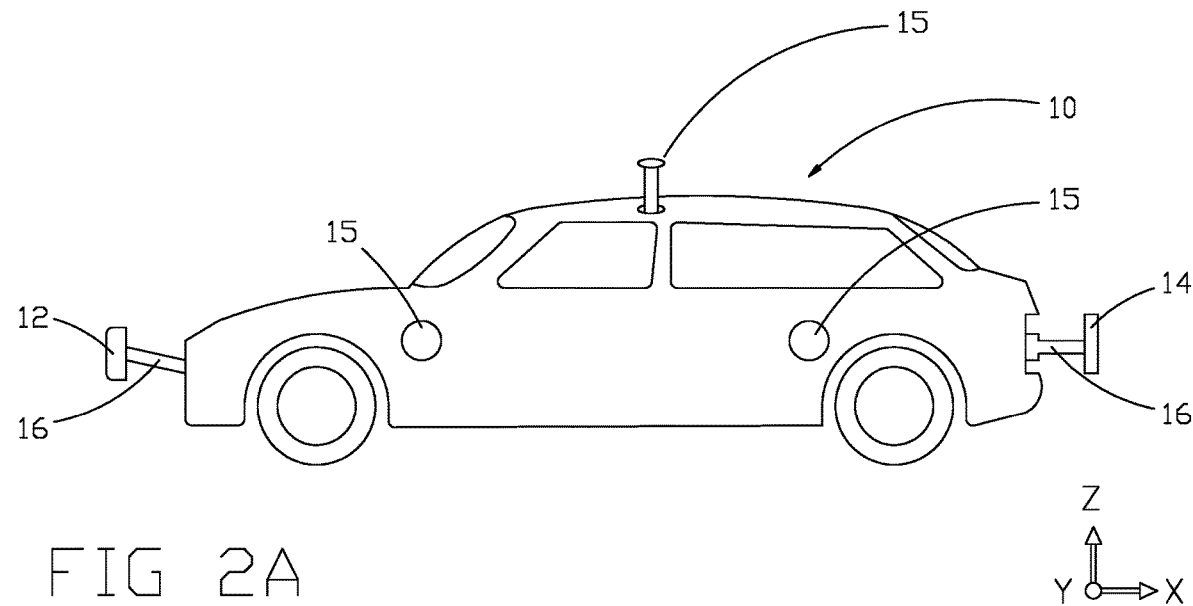
FIG. 2A illustrates a side view of a transportation vehicle in accordance with some embodiments.

FIG. 2A is a side view illustrating the transportation vehicle 10 comprising extendable bumpers 12, 14-15 in accordance with some embodiments. This figure also illustrates a plurality of extendable bumpers to illustrate extendable bumpers at the front, back, sides, and roof of the vehicle. However, some of the embodiments of the present invention may comprise one or more extendable bumpers. In this view, the extendable bumpers are extended.

Figure 1B:
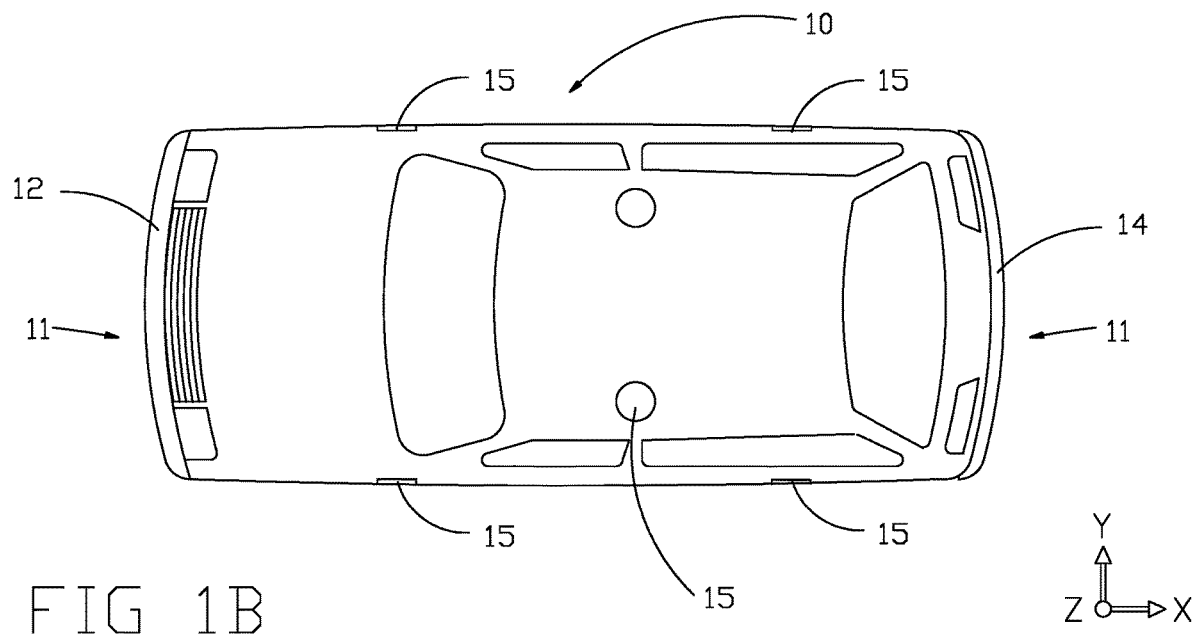
FIG. 1B illustrates a top view of a transportation vehicle in accordance with some embodiments.

FIG. 1B is a top view illustrating the transportation vehicle 10 comprising extendable bumpers 12, 14-15 in accordance with some embodiments. In this view, the extendable bumpers are not extended.

Figure 2B:
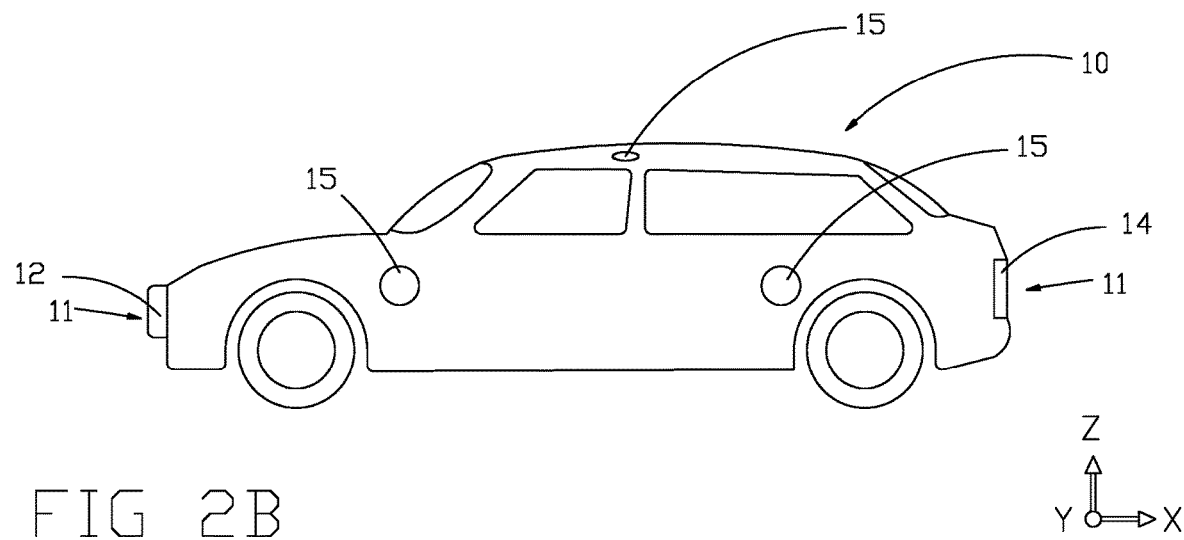
FIG. 2B illustrates a side view of a transportation vehicle in accordance with some embodiments.

FIG. 2B is a side view illustrating the transportation vehicle 10 comprising extendable bumpers 12, 14-15 in accordance with some embodiments. In this view, the extendable bumpers are not extended.

In these figures, the transportation vehicle is shown as a common automobile, but the transportation vehicle may comprise a truck, bus, trailer, tractor, train, motorcycle, bicycle, tricycle, quad, autonomous vehicle, vehicle on a rail, or any other transportation vehicle.

As the mechanisms for extending the bumpers are obscured in FIGS. 1B and 2B, these figures also represent the prior art wherein common bumpers do not appreciably extend forward. In the prior art, common bumpers may flex slightly forward during deceleration, but they do not significantly extend outward from the body 305 of the vehicle 10, or substantially move relative to the body, except during some collisions. This is well known in the art. Thus, the extendable bumpers of some of the embodiments of the present invention disclose bumpers that move farther outward from the body by a greater distance than a common bumper, and they may provide a greater distance with which to decelerate the vehicle, than a common bumper system will for a vehicle of the same resting or body length. Regarding the term "resting", this term refers to the length of a common vehicle with common bumpers, and also to the length of a vehicle with extendable bumpers in their non-extended and retracted state.

Attention is now directed towards embodiments of the device.

Figure 4A:
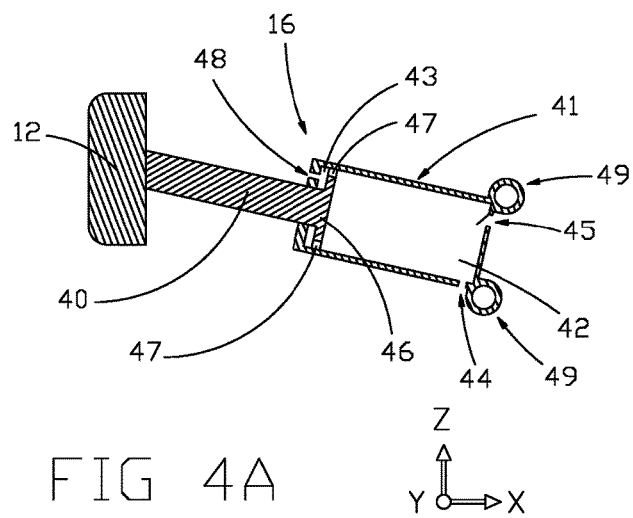
FIG. 4A illustrates a cross sectional side view of an extendable bumper assembly in accordance with some embodiments.
Figure 4B:
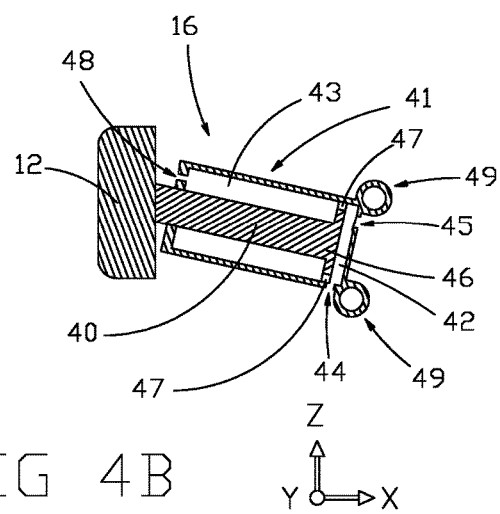
FIG. 4B illustrates a cross sectional side view of an extendable bumper assembly in accordance with some embodiments.

In an embodiment, a vehicle 10 (FIGS. 1A, 1B) comprises an extendable bumper assembly 11 comprising an extendable bumper 12 and one or more extendable members 16; wherein each extendable member is an assembly that comprises a stanchion 41 and a slider 40 (FIGS. 4A, 4B). In an embodiment, the stanchion 41 houses one or more chambers 42, 43, as illustrated in FIG. 4A, 4B. The stanchion may comprise a cylinder with a round cross section, but may also comprise other cross-sectional shapes, such as an oval. Further, the cross-sectional shape of the piston is generally circular, but may also comprise other shapes, such as an oval or box section (which could be a rounded box section).

In an embodiment, the slider 40 comprises a piston 46 that divides the stanchion into one or more chambers. In an embodiment, the internal area of the stanchion is divided into a first chamber 42 and a second chamber 43 by the piston. In this embodiment, the chambers are filled with air, but could be another common gas. The slider comprises a piston 46 which may comprise one or more piston seals 47. The piston may incorporate the piston seal into the piston as one part.

In an aspect of some of the embodiments of the invention, the second chamber can be eliminated. For example, the slider and piston could be one piece and/or comprise the same diameter. In this case, there would be no room for the second chamber. In another aspect of the embodiment, the slider shaft may slide against a seal that the stanchion housing comprises. This has not been shown in the accompanying drawings, as it is common practice and unnecessary for understanding the invention. And in another aspect of many of the embodiments of the invention, attaching an extendable bumper assembly to a bumper and to a vehicle is within the skill in the art. FIG. 4A and 4B shows two mounting brackets or flanges 49, but the bumper assembly could be mounted to the vehicle in a variety of ways. Methods to mount a stanchion, assembly, or other elements to the vehicle or chassis have not been shown in other drawings as it would unnecessarily clutter the drawing and is unnecessary for understanding the invention.

The stanchion 41 also comprises a valve 45 and a passage 48 and a hole 44. FIGS. 4A and 4B illustrate the extendable member assembly separated from the body of the vehicle for clarity. The stanchion is attached to the body, chassis, and/or frame of the vehicle.

FIG. 4B shows a cross section of one of the extendable members in its nonextended state. This is the state the extendable bumper will be in when not extended by a force or signal to extend for a possible collision. This may be considered an initial state.

Figure 10A:
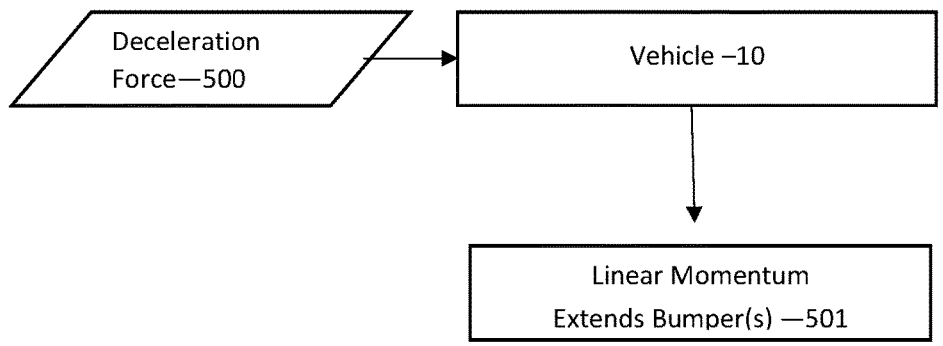
FIG. 10A illustrates a flowchart in accordance with some methods of the invention.
Figure 10B:
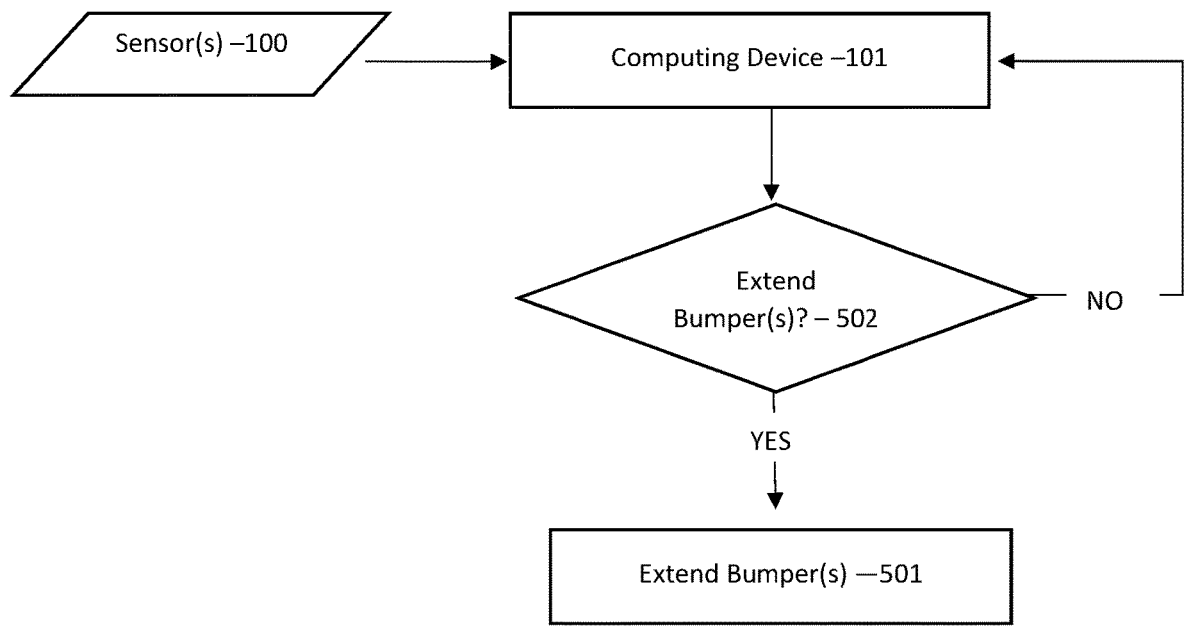
FIG. 10B illustrates a flowchart in accordance with some methods of the invention.

In a method of the embodiment, a vehicle brakes. Braking exerts a deceleration force 500 (FIG. 10A) on the vehicle, which in turn puts a force on the on the extendable bumper assembly. In response to the deceleration of the vehicle, an extendable bumper 12 extends outward from the vehicle, as illustrated in FIG. 2A. During braking, a force is exerted on the extendable bumper and extendable members. The linear momentum of the bumper and the slider 501 (FIG. 10A) will in turn force the air in the second chamber to flow out of the chamber through a passage 48 (FIG. 4B, 4A). However, a separate passage need not be present, as air may escape though space between the slider and the stanchion chamber, or across or through the piston or piston seals, or though other common means to keep the air pressure from significantly rising in the second chamber during extension.

In this embodiment and method, the valve 45 (FIG. 4A) is opened by a differential in air pressure between the outside air and the air in the first chamber 42. The use of the valve is to keep the keep the air pressure from significantly rising in the first chamber and impeding the extension of the bumper. The bumper and slider assembly of this embodiment will thus extend through its own linear momentum during braking of the vehicle.

In an aspect of the invention, extendable bumpers may be extended through rotation, or other non-linear paths. The term "linear momentum" generally refers to the momentum the bumper, or other part, has which is a product of its mass and velocity in the direction it is currently moving. Thus, for this disclosure, the linear momentum may be rotational momentum or other non-linear forms of momentum. The term "linear" does not limit the extension of all bumper and/or assembly embodiments to a linear extension. Embodiments may utilize any form of momentum to extend bumpers.

After extending, the bumper and slider will be fully extended, as illustrated in FIG. 4A. If at this point in time, the vehicle collides with an object, the bumper 12 will be moved generally in the positive X direction (assuming a coordinate system relative to the body of the vehicle), and toward the stanchion. The piston of the slider will likewise be moved in the same direction which will compress the air in the first chamber 42. The subsequent rise in air pressure will close the valve 45 preventing air from exiting from and/or through the valve, as illustrated in FIG. 4B. Further, some air in the chamber will escape from the hole 44 in the stanchion, but the hole will be sufficiently small enough so that the pressure in the chamber will significantly rise. The rise in air pressure in the first chamber will cause a force to be applied to the stanchion, which is substantially rigidly attached to the body, chassis, and/or frame of the vehicle. Thus, the vehicle will be decelerated by the force over some of the distance the bumper and slider move. This in turn decelerates the vehicle. In this embodiment, it decelerates the vehicle over a greater distance than a common bumper provides. As is clear to a person skilled in the art, decelerating the vehicle over a greater distance lowers the peak forces applied to the vehicle and its occupants and cargo in many collisions, which can in turn significantly reduce damage and harm from the collision.

The air that escapes, or we can say is compressed from hole 44 provides damping for the system. It prevents a full rebound of the piston and system and lowers the rebound force. In an aspect of some of the embodiments of the invention, other common forms of damping may be utilized. In an aspect of some of the embodiments of the invention, the hole is preferably located in the stanchion closest to the ground so that any moisture that might make its way into the chamber may drain out. In an aspect of some of the embodiments of the invention, filters may be added to the places air enters and exits the chambers. Filters are common elements. Further, in an aspect of the invention, the valve 45 may have some spring force, or may be a pop-off or variable valve to increase the pressure at various times during a collision event. Further, in an aspect of some of the embodiments of the invention, the valve may be controlled by an actuator 107 which may be controlled by a computing device 101 to increase or decrease the pressure at various times during a collision event.

In an aspect of some embodiments of the present invention, an extendable bumper assembly may comprise a plurality of valves and passages. It is not so much the number, but the area through which a gas or fluid may flow that is more important. In the embodiment of FIG. 4A-4B, the area of the hole is less than and smaller than the area of the open valve. However, and provided the bumper has time to extend relatively slowly, the area of the hole does not necessarily have to be smaller.

In an aspect of some embodiments of the present invention, one or more holes may be used. In an embodiment, one or more of the holes 44 comprises one or more blow-off valves, which open or opens further when pressure is above a threshold. In an aspect of some of the embodiments of the invention, damping may be provided by other common means separate from being incorporated into the first chamber. However, the present embodiment wherein a hole 44 is comprised in the first chamber 42, and air is forced out of it during compression, has the advantage of low cost.

In an embodiment, the one or more holes 44 may be incorporated into each valve 45, with the valve comprising the hole(s). Similarly, the valve may not entirely close. In these embodiments, the closed valve leaves a passage for air to exit the first chamber which is smaller than the passage available when the valve is open. In another embodiment, the piston seals 47 or piston may not seal entirely, leaving a passage for air to exit or pass from the first chamber into the second chamber, which can eliminate the need for the hole. In an embodiment, the piston comprises the valve, which may in turn comprise the hole, which can eliminate gas moving in and out of the stanchion. In an embodiment, surfaces of one or more of the chambers are semi-permeable, allowing some gas to escape during compression.

Some of the above elements are generally found in common bicycle air pumps. While many of the elements are in common with a bicycle pump, the use of the extendable bumper assembly to reduce impact forces is not common. A bicycle pump has an entirely different purpose and use. Further, a bicycle pump has no use for damping or providing compression forces beyond pumping up a tube, tire, or other inflatable. Different means to provide the functions of the elements of the above embodiments are found in different designs for bicycle pumps and may be found in other assemblies in other fields and/or for other uses.

In an aspect of some of the embodiments of the invention, the valve 45 may be incorporated into the piston 46 or piston seals 47. For example, and in an embodiment, the piston seals 47 flex to allow significantly more air past the seal in one direction than in the opposite direction. Further, the direction the piston is traveling may affect the amount of gas that may pass across the piston, and/or the piston seals may respond to differentials of pressure in a direction to vary the sealing rate. In alternative embodiments, the valve(s) 45 and/or hole(s) are eliminated.

In an aspect of some of the embodiments of the invention, the passage 48 may comprise a valve. In an embodiment of the invention, the passage 48 may comprises a valve and the valve closes during compression of the assembly. This creates a higher differential of pressure and force between the two chambers, which increases the compression force. In an aspect of some of the embodiments of the invention, the momentum of the valve could be used to close the valve in a compression and/or collision event.

In an aspect of some of the embodiments of the invention, it is common for telescoping assemblies comprising sliders and stanchions to include top out and bottom out springs. These elements help eliminate harsh topping out and bottoming out. In an embodiment, the first chamber comprises a spring to prevent the piston from harshly bottoming on the end of the chamber. In an embodiment, the second chamber comprises a spring to prevent the piston from harshly topping out at the bumper end of the chamber.

In an aspect of some of the embodiments of the invention, an extendable bumper may extend away from the vehicle and be angled upward, in the Z direction, or in another direction. This is illustrated in FIGS. 2A, 4A and 4B. The extendable bumper and assembly may be angled by any angle, including no angle wherein the bumper extends outward from the vehicle substantially and generally level with the ground, but not necessarily exactly level with the ground. In FIGS. 2A and 4A the bumper has extended in a generally level direction but also in an upward direction. In an aspect of some of the embodiments of the invention, a vehicle "dives" under braking, wherein the term "dives" is a common term meaning the front of the vehicle lowers, and/or the rear of the vehicle rises relative to the ground. A front extendable bumper assembly that is angled upwards may help compensate for brake "dive". A rear extendable bumper assembly that is angled slightly downward may help compensate for brake "dive".

In an aspect of some of the embodiments of the invention, extendable bumpers may extend downward from vehicles with normally high bumpers, such as pickup trucks. This can help provide a contact height commensurate with the height of a common car to give better odds that the bumpers of the vehicle, and the bumpers of another vehicle line up, whereby the bumpers contact each other in a collision, as opposed to one bumper missing the other and contacting the body first.

In an aspect of some of the embodiments of the invention, the amount of upward or downward extension of an extendable bumper may be varied depending on a determination of values of an object, wherein the values are determined by one or more perception systems 280, one or more sensors, and/or one or more communication system(s) 213. For example, if a likely collision is determined and the collision is with a truck with higher than normal bumpers, the extendable bumpers would extend outward and upward to match the height of the trucks bumpers.

Provided an extendable bumper and assembly is not compressed to the non-extended state by contact with an object, the bumper may be retracted, or partially retracted, at least partially by the force of gravity in the embodiment illustrated in FIGS. 2A, 4A and 4B.

Further, in an embodiment, the extendable bumper and assembly may comprise a spring 18, as illustrated in FIG. 1A. One end of the spring is attached to any part of the assembly that extends outward from the vehicle. The other end is attached to any part of the vehicle that does not extend, or the body, chassis, and/or frame of the vehicle. The spring provides a force to compress the slider into the stanchion. Both a spring, and an angled design provide a force to recompress the bumper assembly to the non-extended state (FIG. 1B, 2B, 4B) in some embodiments. The force will cause the piston to compress air out of the first chamber through the hole, which will compress the bumper to the non-extended state. This may happen slowly. The angled design also uses the force of gravity to compress the bumper to the non-extended state.

A non-extended (retracted) state does not unnecessarily lengthen the vehicle, which provides the benefit of easier parking. In most embodiments the non-extended state is the normal state of the bumper assembly. For example, the normal state is comprised of the vehicle at rest or in motion when a likely collision is not detected and/or a force is not acting on the vehicle to decelerate or accelerate the vehicle. However, in an embodiment the vehicle may extend the bumpers at speed. Also in an embodiment, the vehicle may extend the bumpers at any time a collision is more likely than average or higher than a threshold.

In an aspect of some embodiments of the invention, extending bumpers at speed may have detrimental effects on the aerodynamic efficiency of the vehicle, depending on their shape. As such, some embodiments may exclude extending the bumpers at speed, such as when a collision is not likely. However, extending bumpers at speed may be neutral or benefit aerodynamic efficiency. Further, extending bumpers at speed may interfere with parking, or the drivers judgement of how far the front of the vehicle extends in tight circumstances.

In some embodiments of the invention, extendable bumpers are not extended based on detection of speed alone, or an indicator of speed, such as being in gear or in some gears, or shifting into a gear, or crossing a speed threshold, rotational speed of a component such as one or more wheels, etc. In some embodiments of the invention, extendable bumpers are not retracted based on detection of speed alone, or an indicator of speed, such as being in gear or in a gear, or neutral, or shifting out of a gear (into neutral), or crossing a speed threshold, etc. Crossing a speed threshold is common and may comprise detecting a speed above, below, or equal to a speed threshold value, or a change from one of these three states to another.

In an embodiment of the invention, the extendable member 16 is comprised of a series of stanchions and sliders to provide the same or more extendable distance as a single stanchion/slider assembly, but with a smaller compressed length. One slider into one stanchion is the stanchion of another slider into which it slides. In an aspect of some of the embodiments of the invention, and in other words, the sliders and stanchions may be nested. Thus, there may be more than one slider and/or stanchion per extendable member assembly.

Figure 5:
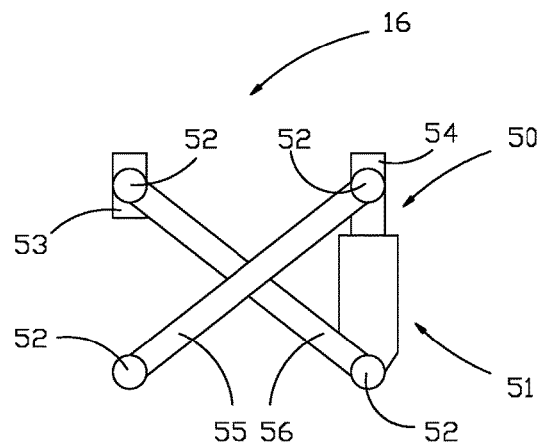
FIG. 5 illustrates a side view of an extendable member assembly in accordance with some embodiments.

In an embodiment of the invention, the extendable members 16 comprise a scissor arrangement of rigid members. FIG. 5 illustrates an embodiment comprising a scissor arrangement of rigid members. The embodiment comprises a telescoping assembly of a slider 50 and stanchion 51 that is connected to the ends of two rigid arms 54 and 55. In this case, the slider and stanchion are similar to what is commonly referred to as a "pull shock", whereas the previously described embodiment is similar to what is commonly referred to as a "push shock". While it is not shown in the current figure, the valve 45 and hole 44 are switched from the first passage 42 to the second passage 43. Likewise, the passage 48 is switched to the first chamber 42. This "pull shock" absorbs the force of a collision by pulling apart.

The ends of members comprising arms 55 and 56 are attached to the body of the vehicle. The end of arm 56 is connected to a pivot 52 where it is attached to the body. The end of arm 55 is connected to a pivot 52 which is attached to a slide-able member 54. Slide-able member 54 slides relative to the body. Likewise, on the bumper side, arm 55 is attached to the bumper through a pivot 52 that allows the arm to rotate relative to the bumper. Also, on the bumper side, arm 56 is connected to a pivot 52 which is attached to Slide-able member 53. Slide-able member 53 slides relative to the bumper. The sliding occurs in the general Y direction.

Figure 3:
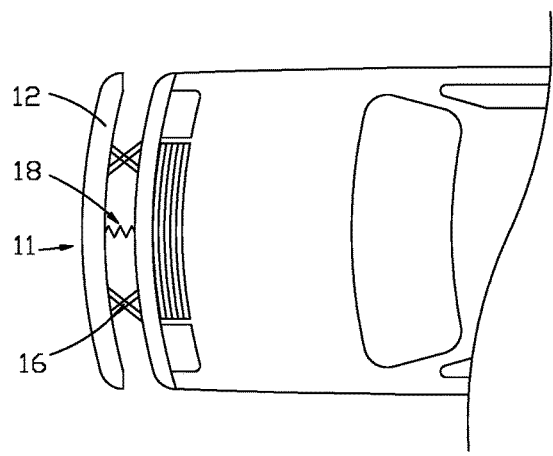
FIG. 3 illustrates a top view of a transportation vehicle in accordance with some embodiments.

In an embodiment, the embodiment comprises two extendable member assemblies positioned on two sides of the vehicle, as shown in FIG. 3. The assemblies may be mirror assemblies of each other, or not. This arrangement allows the bumper 12 to extend forward by the rotation and sliding of the arms which become narrower in the Y direction and lengthen in the negative X direction. This embodiment may require less in space in the body compared to the previous telescoping embodiment disclosed above. In an embodiment, a pivot may be placed where arms 55 and 56 cross.

In an embodiment, the extendable member comprises a bellow that replaces the function of a telescoping assembly. In an embodiment, the extendable member comprises an inflatable bag that replaces the function of a telescoping assembly. In a difference to the prior art of external airbags, this embodiment comprises an inflatable bag that extends a rigid or semi-rigid bumper, wherein the bumper is not as easily punctured, as is an inflatable bag or airbag. The object with which the vehicle may collide may have sharp objects which could puncture an airbag by itself. Prior art airbags do not comprise the substantially rigid or semi-rigid bumpers of the present invention. In an aspect of some of the embodiments of the invention, the bumpers of the invention could be filled with compressed gas providing some rigidity, but in this case the gas would not be substantially connected to gas used to extend the bumpers.

In an aspect of some of the embodiments of the invention, some extendable bumper assemblies may be placed at the rear of the vehicle, at the sides of the vehicle, or at or on other surfaces and orientations. A vehicle that is moving backwards and brakes could extend a rear extendable bumper of some embodiments of the invention. Likewise, a vehicle that slides approximately 90 degrees sideways could also extend an extendable bumper of some embodiment of the invention due to forces the friction of the tires sliding would impart on the assembly.

In an aspect of some of the embodiments of the invention, one or more hoses or ducting connect one or more chambers. In an embodiment, and illustrated in FIG. 7, a hose 105 connects and provides a passage from a second chamber 43 in a front extendable bumper assembly to a first chamber 42 in a rear bumper assembly. Provided the front bumper is significantly heavier than the rear bumper, the force of the vehicle braking in a forward direction will force air from the second chamber in a front extendable bumper assembly through the hose to the first chamber in a rear bumper assembly, which will enable both the front bumper and the rear bumper to extend. This method of extending both front and rear bumpers can thus provide increased protection of both ends of the vehicle from some common collisions, compared to common non-extendable vehicle bumpers.

In an aspect of some of the embodiments of the invention, one or more hoses or ducting may connect one or more chambers for the use of extending a bumper on one end of a vehicle in response to a bumper assembly on the other end of the vehicle being compressed during a collision. For example, a vehicle colliding with a vehicle in front of it will compress the front extendable bumper assembly, which would then in turn extend a rear bumper assembly by increased gas pressure resulting from the compressed gas traveling through the hose(s) or ducting. This method would be effective in a particularly common collision event in traffic where a vehicle collides with the vehicle in front of it, and then the vehicle behind collides with it.

EMBODIMENTS COMPRISING SENSORS AND ELECTRONICS

Most of the above embodiments disclose all-mechanical embodiments. In an aspect of some of the embodiments of the invention, sensors 100 (FIGS. 6A, 6B), a computing device 101 (FIGS. 6A, 6B), perception systems, and signals 106 (FIGS. 6A, 6B) comprise one or more electronic systems that may be combined with one or more actuators 107 and/or electro-mechanical elements, and some of the mechanical elements of the embodiments of the invention. This combination may be employed to determine if a collision is determined to be likely and extend the extendable bumpers in response. (A computing device 101 comprises common computing elements such as one or more processors 200, memory 203, data 202, instructions 207, ports, software 214, etc.) Further, a perception system 280 comprising sensors combined with computing devices 101 may be used in the determination of a likely collision. Perception systems currently exist.

In an embodiment, the determination of a likely collision is made through the electronic system. Upon the determination that a collision is likely, the bumpers are extended by the computing device 101 sending a signal 106 to an actuator 107 to extend one or more of the extendable bumpers. In an embodiment, the bumpers are extended by inserting and/or releasing compressed and pressurized air into one or more chambers of some of the embodiments of the invention, or by other common means. A combined system may protect the vehicle from more types of collisions than a pure mechanical system. However, a pure mechanical system will have the benefit of a lower cost, which will likely provide the benefit of a greater worldwide acceptance rate.

In an embodiment, the extendable bumpers are extended above a threshold of vehicle speed (velocity) and/or other detections and determinations of the invention.

All mechanical embodiments and embodiments that employ electronic systems may be included in a vehicle in any combination. However, an embodiment may exclude some elements and combinations. The preferred embodiment varies depending on the cost a customer is willing to pay, among other variables.

Electronic systems employing sensors 100, computing devices 101 comprising common computing elements, perception systems 280, and signals 106 currently exist in many vehicles in the art for the purposes of automatic braking, collision avoidance, and/or autonomous driving. These existing systems may be utilized with actuators to extend some bumper embodiments of the invention for the use of reducing peak forces of collisions and/or lowering or preventing damages. Sensors and computing devices are common elements. A computing device commonly comprises one or more processor chips 200, memory 203, data, ports 201, and software 214. FIG. 8B lists common computing elements utilized in some embodiments of the present invention.

A computing device may detect signals from sensors 100, compute, and determine and output signals to hardware devices, such as outputting a signal to extend a bumper. In an embodiment, a vehicle 10, as shown in FIG. 8A, comprises one or more sensors 100, computing devices 101, and signals 106.

Computing devices, sensors, and electronic systems may also comprise common computing features and elements such as accelerometers 253, gyroscopes 254, GPS 256, compass 255, cameras 250 (visible, infrared, or other spectrum), lidar 251, radar 252, antennas, wireless communication chips and protocols 213 (such as Cellular, WiFi 276, Bluetooth, etc.), etc. as listed in FIG. 8D.

Figure 6A:
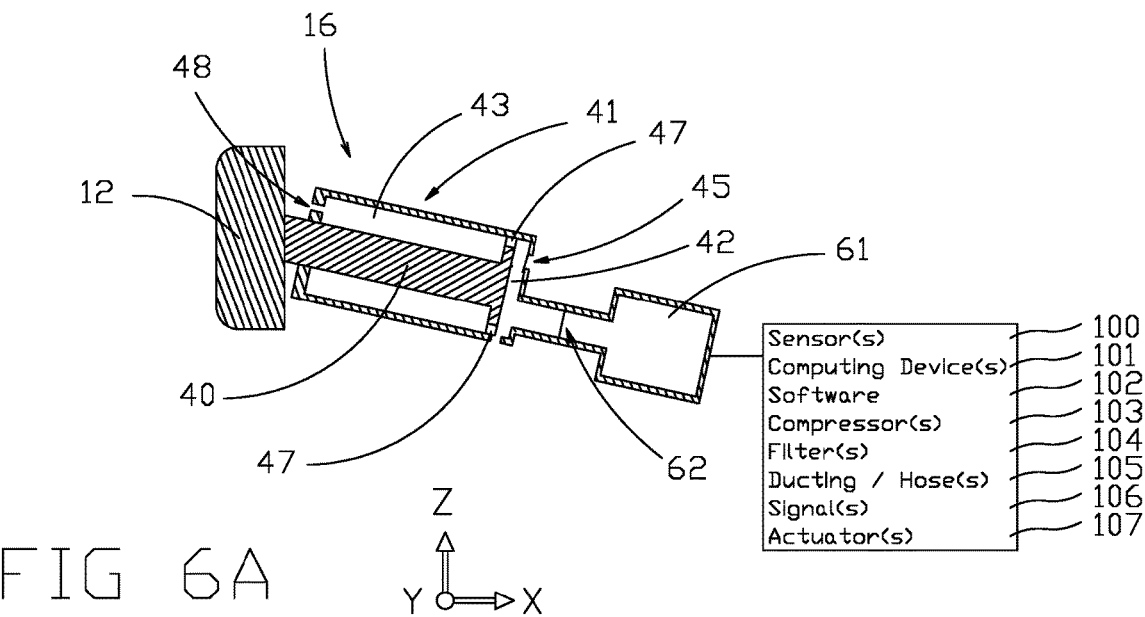
FIG. 6A illustrates a cross sectional side view of an extendable bumper assembly in accordance with some embodiments.
Figure 6B:
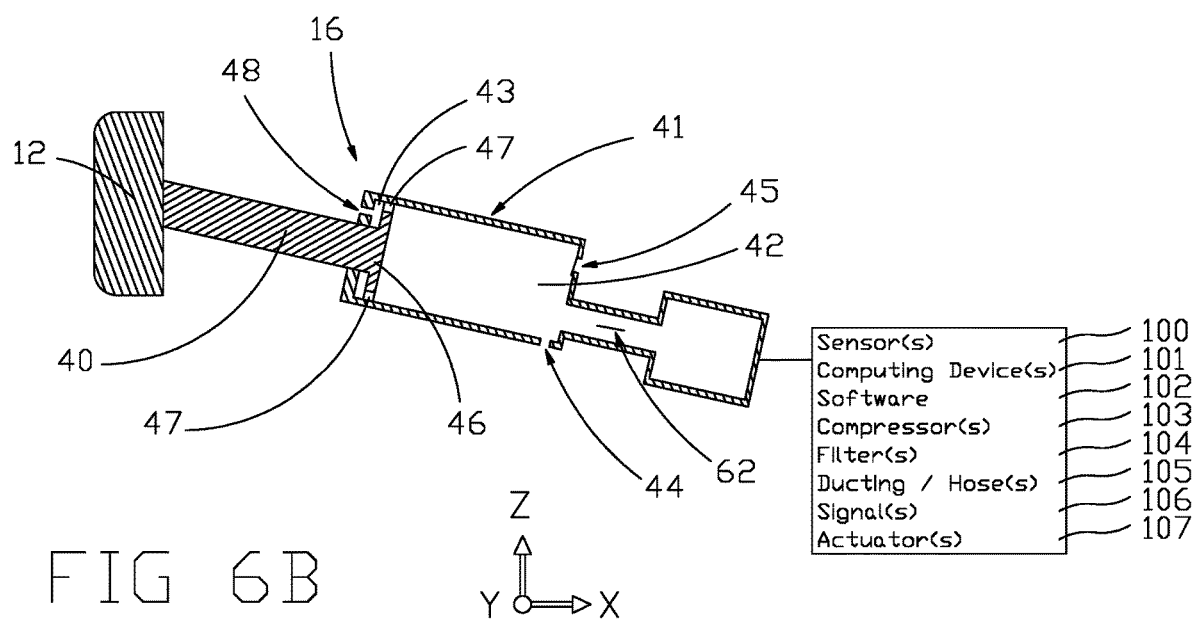
FIG. 6B illustrates a cross sectional side view of an extendable bumper assembly in accordance with some embodiments.

In an embodiment, a slider/stanchion assembly further comprises a tank 61 and a tank valve 62 (FIGS. 6A, 6B). The tank houses compressed air, which may be supplied by a common air compressor 103. The air compressor is located in the vehicle. Wherein the compressor may receive signals to keep the air compressed in the tank by common means, which may comprise one or more pressure sensors and switches to start and stop the compressor(s). Or the tank may be filled at the factory that manufactures and/or assembles the extendable bumper assembly. In this case, the compressor in may not be located in the vehicle.

In an aspect of some of the embodiments of the invention, one tank 61 of compressed gas may supply compressed gas (air) to one or more chambers to extend one or more extendable bumpers. In an aspect, pyrotechnics may be utilized to extend a bumper. However, and unlike airbags, bumpers do not necessarily need to be extended as quickly as an airbag, as they are extended in many embodiments in the event a collision is likely, and not currently in progress. Thus, they can in many embodiments avoid pyrotechnics, which are generally one-use devices.

In this embodiment utilizing compressed gas, the vehicle determines an imminent or likely collision by common means, or by any of the methods and embodiments of the present invention for making this determination. Upon this determination, a signal is sent to the tank valve 62 by common means to open. Common means to open a valve comprise valve actuators. Valve actuators may comprise power-operated actuators, using electricity, but may also utilize gas pressure, hydraulic pressure, or spring force. Valve actuators are common elements. Upon opening of the tank valve 62, as illustrated in FIG. 6B, compressed air enters a first chamber 42 which forces it to extend, wherein the bumper 12 extends to prepare for the coming collision. The compressed air entering the first chamber will close valve 45 in that chamber by the differential in air pressure between the compressed air and the outside air.

In an aspect of some of the embodiments of the invention, the valve 45 can be closed by other means, such as an electrically powered valve actuator.

This embodiment can handle more situations, than the purely mechanical embodiments described above. For example, if the sensors, computing system, and/or software determine that a collision is likely, even though the vehicle may be at a stop, the vehicle can extend its bumpers in anticipation of the coming collision. Further, this embodiment may determine that a collision is likely even though the driver may be unaware of the possible event and extend its bumpers.

Further, this embodiment can extend bumpers from all sides of the vehicle, or even the roof, as the linear momentum of the bumper itself does not need to be utilized to extend a bumper.

Further, upon collision, the compressing of the gas in a first chamber may begin from a higher initial pressure, which provides a greater initial deceleration force applied to the vehicle compared to the all mechanical embodiments. Further. The deceleration force may be greater throughout the stroke, depending of whether or not the area of the hole is increased or not.

This can provide lower peak deceleration forces to the occupants or cargo of the vehicle than a pure mechanical system provides, and thus may be safer in many collisions.

In an aspect of some of the embodiments of the invention, the hole 44 may comprise a pop-off valve, such that the gas will not substantially flow through the hole until a threshold of pressure differential is reached between the outside ambient pressure, and the pressure within the chamber that comprises the hole. In an embodiment that uses compressed air, this feature can keep a substantially level the amount of gas pressure in the chamber from the time the bumper was extended with compressed air to the time the collision actually occurs. This provides a more consistent response. Without a pop-off valve, the hole will reduce the pressure in the pressurized chamber over a given period of time to the ambient outside air pressure. A pop-off valve is a common element, however, the uses of the pop-off valve disclosed here within is not.

Figure 9A:
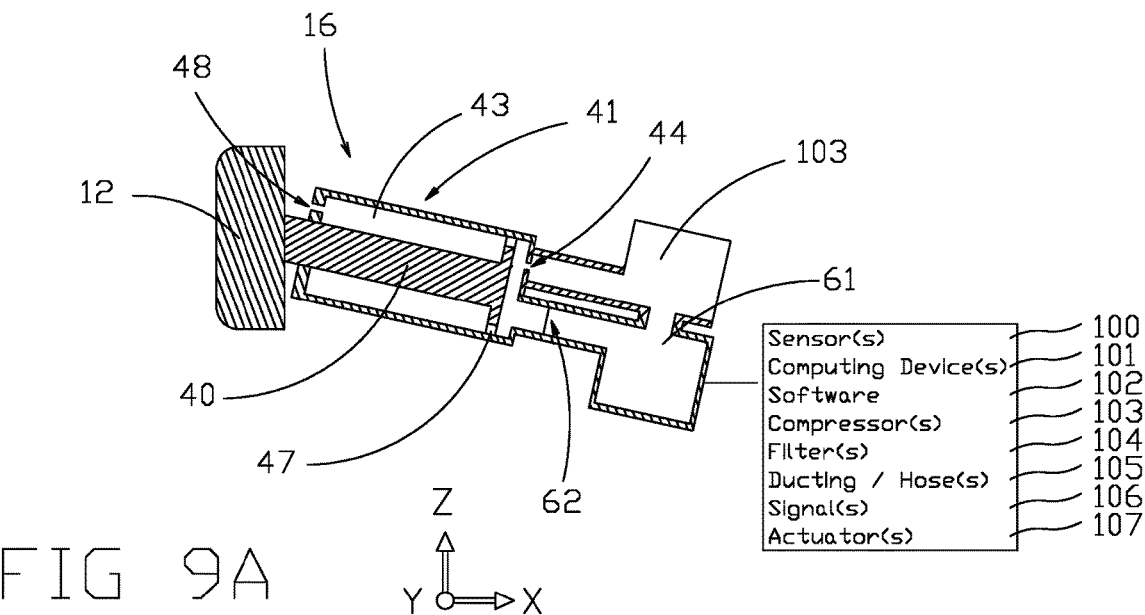
FIG. 9A illustrates a cross sectional side view of an extendable bumper assembly in accordance with some embodiments.
Figure 9B:
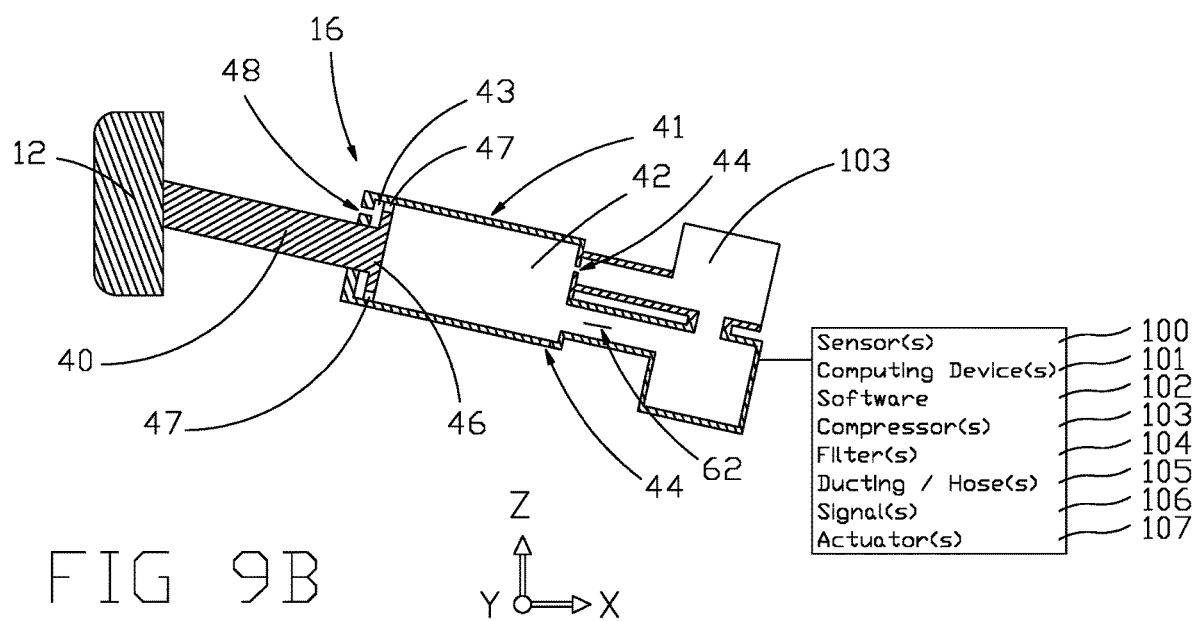
FIG. 9B illustrates a cross sectional side view of an extendable bumper assembly in accordance with some embodiments.

In an aspect of some of the embodiments of the invention, valves and holes leading to outside the system ambient air can be eliminated and the gas to extend the extendable bumpers may be in a closed system. In an embodiment, as illustrated in FIG. 9A, gas (which may be air) is sucked or compressed out of a chamber by a common compressor 103 of the extendable bumpers to compress the bumpers to their un-extended/retracted state. Once the gas is compressed in the tank the tank valve may open to extend the extendable bumpers, as shown in FIG. 9A. Opening the tank valve for a short period of time can extend the bumpers, but not necessarily to their fully extended state/position.

In an aspect of some of the embodiments of the invention, the one or more compressors may compress ambient air, or gas from within the extendable bumper assembly, into one or more tanks 61. (The term "tank" here is used to distinguish it from the other chambers of some of the embodiments of the invention. A tank though does comprise a chamber.) Further, the one or more compressors may be used to remove gas from one or more chambers. The term "ambient" here comprises the same pressure as the outside air.

In an embodiment of the invention, the tank valve 62 and compressor are controlled by a computing system 101 to retract or extend the extendable bumpers to a length anywhere in the range of fully extended to retracted. In an aspect of some of the embodiments of the invention, sensors 100 can be provided to feedback to the computing system how far the bumpers are extended. Sensors may comprise pressure 206 and/or position 261 sensors.

Figure 12:
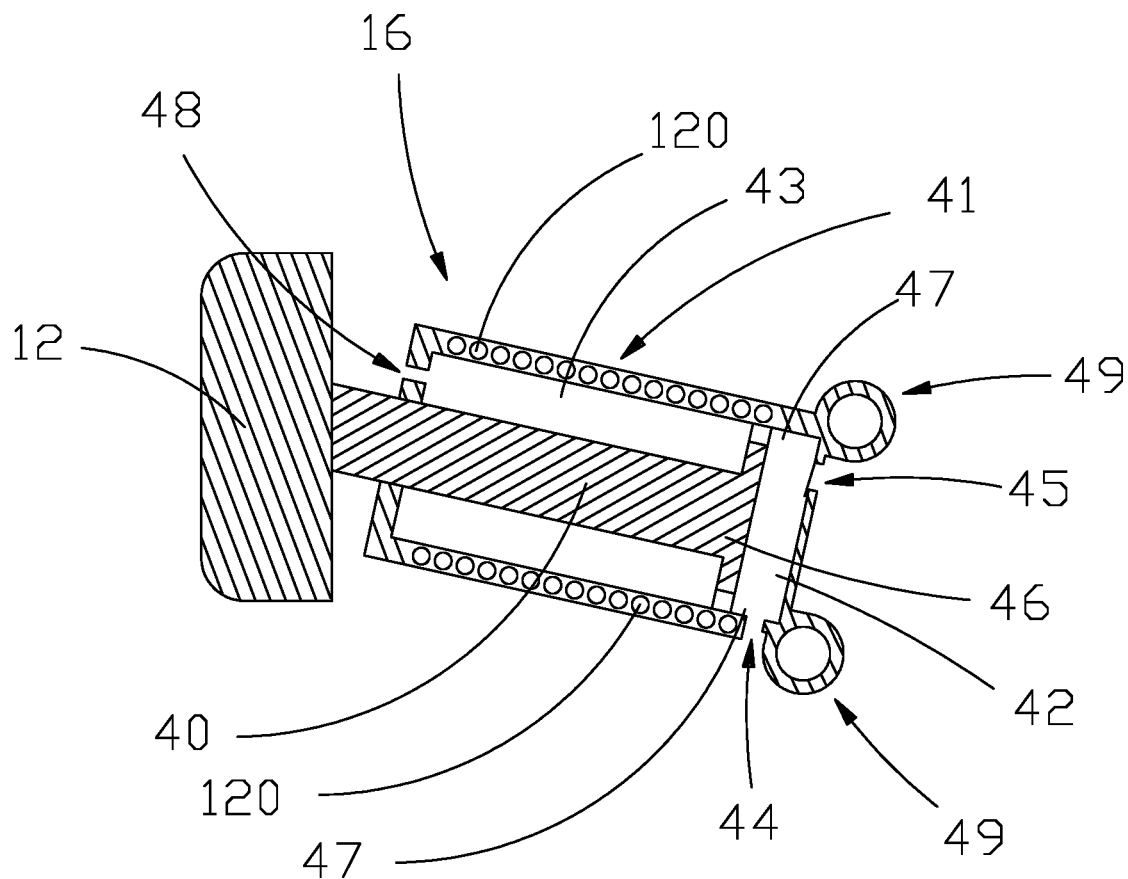
FIG. 12 illustrates a cross sectional side view of an extendable bumper assembly in accordance with some embodiments.

Some of the embodiments of the invention comprise linear actuators. In an aspect of some of the embodiments of the invention, other known forms of linear actuators may be utilized to provide the extension of a bumper and/or turn the compression of an extendable member into a damping and/or spring force. In an embodiment, the extendable member may comprise one or more coils and magnets. FIG. 12 illustrates an embodiment comprising a coil 120, and comprising a piston 46 and/or slider 40 comprising a magnetic material. Wherein direct current may be applied to the coil to move the piston and/or slider in a direction causing the extendable bumper to extend or compress and/or retract. Further, compressing the extendable member using a coil and magnet assembly may induce a current (DC or AC) that can be dissipated with a resistor and/or stored in a capacitor, which provides the damping and/or spring force. Further, if AC power is utilized, a linear array of coils and/or magnets can be utilized for the use. Wherein magnets may comprise one or more Halbach arrays, horseshoe magnets, magnets with channels, or common magnets or arrangements of magnets. The means to extend bumpers may comprise electro-mechanical actuators.

Further, rotary actuators or motion may be utilized to extend bumpers outward from a vehicle. Bumpers do not necessarily need to be extended linearly, but they need to be extended generally outward from the vehicle.

Rotational motion may drive a leadscrew, screw jack, ball screw, roller screw, or other common screw to extend bumpers. Further, wheels, axles, rack and pinions, chain drives, belt drives, rigid chains and rigid belt actuators may be utilized to extend bumpers outward.

In an aspect of some of the embodiments of the invention, hydraulic systems generally use incompressible fluids and are thus unsuitable to use for compression. However, and in an embodiment, a strut comprising a piston and chamber (slider/stanchion) may be filled with hydraulic fluid. The fluid may flow into a chamber comprising a dome comprising a gas filled space, wherein the gas is compressed by the fluid flowing into the chamber. Automobile manufacturer Citroën has in the past used similar elements to provide the entirely different use of oleopneumatic (often referred to as hydropneumatic) suspension for its automobiles, starting with the DS model from the 1950's. Citroën referred to the chamber and dome housing hydraulic fluid and (in their product) nitrogen, as an "hydraulic accumulator sphere". Further, their hydraulic accumulator sphere comprised a membrane to separate the hydraulic fluid from the gas, as may be incorporated here. In an aspect of some of the embodiments of the invention, air may be used for the gas provided non-corrosive materials are utilized.

Figure 11A:
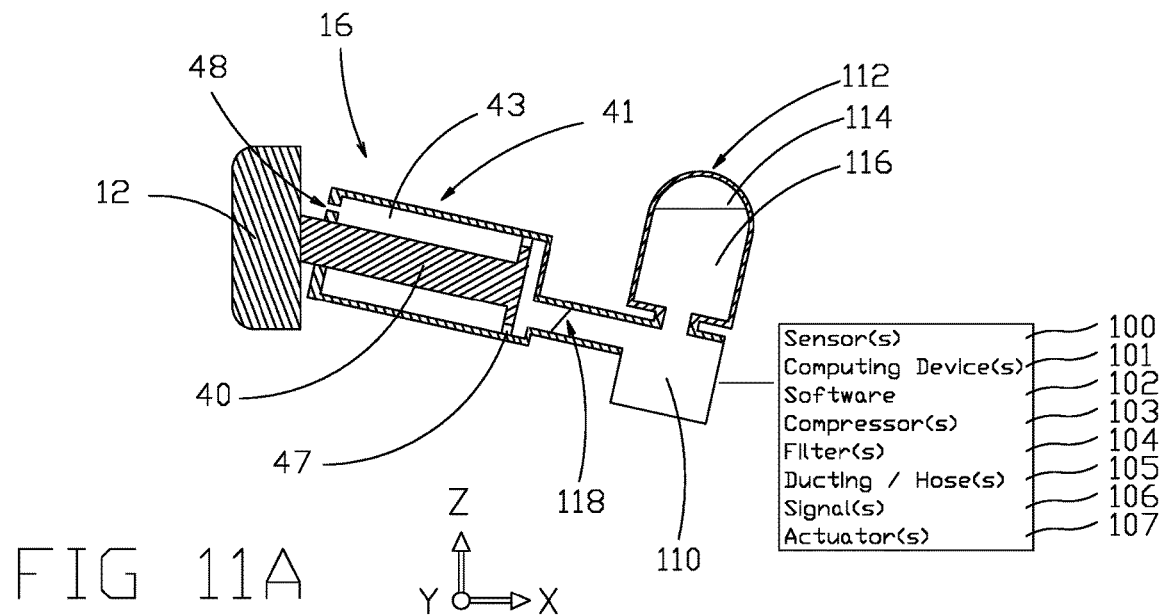
FIG. 11A illustrates a cross sectional side view of an extendable bumper assembly in accordance with some embodiments.
Figure 11B:
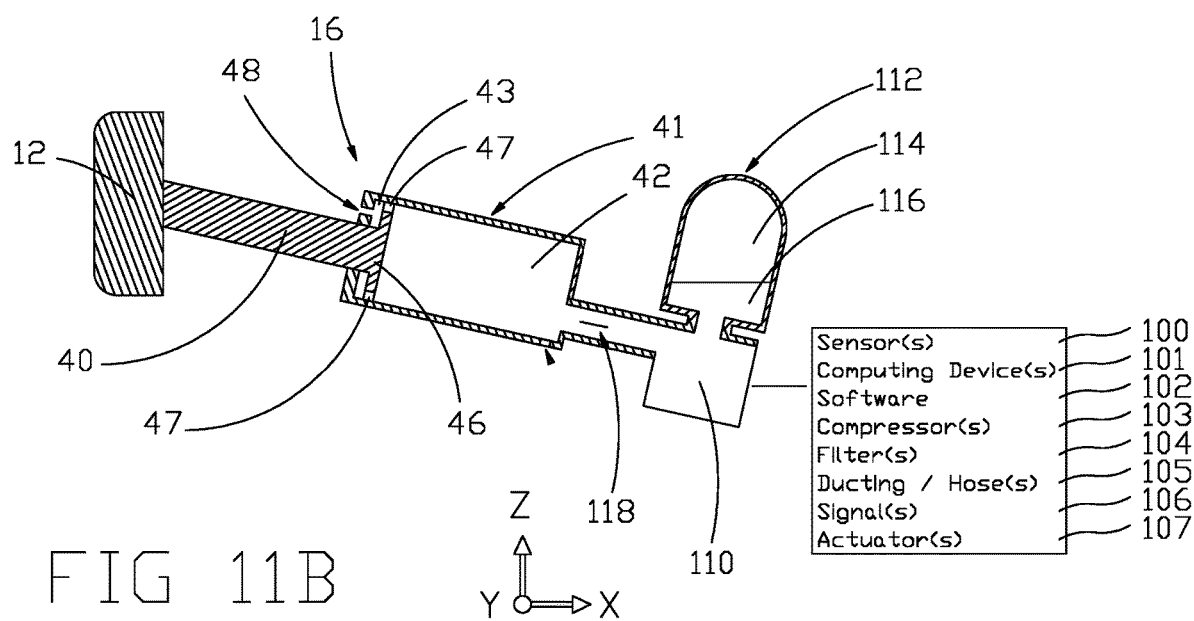
FIG. 11B illustrates a cross sectional side view of an extendable bumper assembly in accordance with some embodiments.

In an embodiment, a pump is used to pump hydraulic fluid to extend an extendable bumper. In an embodiment, as illustrated in FIG. 11A, 11B, one or more pumps 110 is used to pump hydraulic fluid 114 which in turn compresses a gas 116 in a sphere comprising a chamber 112 (but could be any shape). In this embodiment, a valve 118 is opened and an extendable bumper is extended by the hydraulic fluid which is moved by the compressed gas expanding, as illustrated in FIG. 11B. In this embodiment, the first chamber 42 is filled with hydraulic fluid.

In this embodiment, damping is handled by a damping valve 118 or hole through which hydraulic fluid is moved during compression of the bumper. In an aspect of some of the embodiments of the invention, the gas in the chamber or sphere may comprise the damping. In an aspect of some of the embodiments of the invention, valve 118 may comprise a valve to release hydraulic fluid to extend the bumper, and it may also comprise a damping valve. Or alternatively, these functions may be handled by two separate valves, or a valve and a hole. FIG. 11B shows the valve 118 fully open for extending the bumper, and FIG. 11A shows the valve partially closed to provide damping on compression of the extendable bumper assembly, wherein the fluid is forced back toward the sphere, compressing the gas. As can be seen in the difference in height of the hydraulic fluid from FIG. 11A to FIG. 11B, some fluid has moved out of the sphere into the stanchion and the gas 114 has uncompressed in FIG. 11B and expanded in volume.

In an aspect of some of the embodiments of the invention, a system of a plurality of extendable bumper assemblies may use one or more pumps, chambers, and valves. For example, a vehicle may comprise one pump, chamber, and valve to extend all of its bumpers. But as configured, it would lose the ability to extend individual bumpers. However, this embodiment would have a lower cost.

In an aspect of some of the embodiments of the invention, embodiments that utilize hydraulic fluid may have greater initial damping than an all gas system which may result in lower impact forces in certain collisions.

In FIGS. 11A and 11B, outside air is allowed in the second chamber 43. However, in an aspect of some of the embodiments of the invention, hydraulic fluid may fill the second chamber and the second chamber may have a passage to the other hydraulic fluid to complete a closed system not open to outside air. In an alternative embodiment, hydraulic fluid may pass around and/or through the piston and comprise the damping in the system.

In an aspect of some of the embodiments of the invention, embodiments that utilize hydraulic fluid the fluid may be shared with other components and/or the fluid may be part of a larger system. For example, an extendable bumper system may share fluids such as brake fluid, ATF, power steering fluid, etc. An advantage to sharing fluids would be to minimize any extra maintenance for the owner, as well as assembly steps.

In an aspect of some of the embodiments of the invention, the extending of the bumpers may not be visible to the driver of the vehicle. The operation of this feature may be opaque to the operator. Considering that the extended bumpers may take time to un-extend and compress, or that the bumpers may extend an amount on an incline, the operator may be alerted to the state of the bumpers through common signals or informational displays. For example, if the bumpers are in an extended state, the operator/driver should be made aware so that he can allocate extra space for parking.

In an aspect of the field of bumpers, it is commonly known that common bumpers provide protection from small impacts and/or lower speed impacts. In larger and/or higher speed impacts, the body structure and components of common vehicles yield and deform. An advantage of extending bumpers of some of the embodiments of the present invention is that an extendable bumper system will absorb larger impacts before damage occurs to the body structure and/or components than a common bumper system, thus lowering costs to fix a vehicle for many collision events. Further, the larger distance extendable bumpers of some embodiments have with which to absorb impacts compared to common bumpers enable extendable bumpers to be reusable in more collision events. The threshold of the force an external object imparts during a collision that starts to cause damage to the bumper system of a vehicle comprising some embodiments of the present invention can be higher than for a common bumper system.

Multiple Vehicle/Object Communication

In another embodiment, a second vehicle or external object may determine that a collision is likely and send a signal to a first vehicle to extend one or more of its extendable bumpers. The second vehicle or object and first vehicles communicate through wireless communications.

In an aspect of some of the embodiments of the invention, wireless communications may comprise a wireless network between a plurality of vehicles and/or objects which may comprise more than the two vehicles or the vehicle and one other object. The wireless communications may comprise signals, hardware, software, protocols, and other common features and elements of wireless communications apparatus. Wireless communication networks for vehicles are sometimes referred to as V2V (Vehicle-to-vehicle) 271, V2I (Vehicle-to-Infrastructure) 272, V2P (Vehicle-to-Pedestrian) 273, V2D (Vehicle-to-device) 302, V2G (Vehicle-to-grid) 274, and/or V2X (Vehicle-to-Everything) 270, wherein V2X may incorporate one or more of the specific types of V2I, V2V, V2P, V2D, and V2G in any combination. For this disclosure, the term "pedestrian" may also refer to a list of alternative elements comprising cyclists, pets, deer, other animals, skateboarders, riders not inside vehicles, or any object to which a V2P communications devices could be attached, or could carry.

Further, other common communications networks may be selected from a list of alternatives comprising NFC, WiFi, LAN, WAN, and IP to communicate not only with the vehicle with extendable bumpers, but within the vehicle itself.

In an aspect of some of the embodiments of the invention, wireless communications exist for the purpose of communicating with vehicles from outside sources, such as another vehicle. For example, WLAN IEEE 802.11 is family of standards and known in the US as Wireless Access in Vehicular Environments (WAVE) and in Europe as ITS-G5. In an aspect of some of the embodiments of the invention, some embodiments may utilize one of these networks, or a successor, or any other common means of communicating. The present embodiments are not always limited to one of these lists of alternative elements, and may or may not comprise some of these elements, but individual embodiments may be limited to one or more of them. Communications networks may be arranged in one or more common topographies, and implement common protocols. Further, substitution of a future network to provide the communication abilities described here within is within the ordinary skill in the art.

Presently, some of the existing communications networks provide forward collision warnings, or warning signals that comprise signals from a source outside of the vehicle. In an embodiment, these warnings/signals are used as a signal to extend one or more extendable bumpers of the vehicle. In an aspect of some of the embodiments of the invention, the extendable bumpers are extended in response to receiving other common warnings or signals. In an embodiment, the extendable bumpers are extended in response to receiving a platooning signal.

In an embodiment of the invention, the wireless communications comprise a specific signal for the purpose and use of instructing a vehicle to extend one or more of its extendable bumpers. In an embodiment of the invention, the wireless communications comprise a specific signal 301 for the purpose and use of instructing a vehicle to vary a parameter of its extendable bumper system. Parameters may comprise how far to extend, how fast to extend, how much spring and/or damping force should be utilized, which bumpers to extend, how long to extend, etc. Further, in an embodiment of the invention, the wireless communications comprise a specific signal 302 for the purpose and use of instructing a vehicle to retract or unextend or compress one or more of its extendable bumper elements or a specific signal 304 that a possible collision event, as determined by an initiating object, is over.

In an aspect of some of the embodiments of the invention, the first vehicle may not be actively detecting possible collisions except for listening or polling for a signal. The first vehicle only needs to be listening or polling for a signal instructing the vehicle to extend its bumpers. In an example, the first vehicle may be parked and turned off, except for the listening or polling for a signal to extend its extendable bumpers. (Of course, the vehicle may also be active in other ways, such as listening for a signal to unlock the vehicle.) In this case, the vehicle expends a little energy when parked and does not need to expend energy to actively use a perception system to determine if a collision is likely, other than by listening for signals.

In an embodiment where a first vehicle receives a signal 301 from an outside source to extend its extendable bumpers, the vehicle may be parked, stopped, or moving. In this embodiment, passengers, occupants, and cargo in the first vehicle and/or in other vehicles can be better protected from impact forces between the two or more vehicles once the first vehicle's extendable bumpers are extended relative to bumpers that do not extend.

In an aspect of some of the embodiments of the invention, a signal from an external object, such as a second vehicle, may be a signal to brake the first vehicle. The first vehicle may brake and decelerate upon receiving the signal to brake which may in turn extend the bumpers, without a specific signal being sent to the first vehicle to extend its one or more bumpers. In an embodiment, the external object, such as a second vehicle, sends a signal to brake, and in response to receiving the signal the first vehicle extends one or more of its extendable bumpers. In an embodiment, the external object, such as a second vehicle, sends a signal to brake above a threshold braking level, and in response to receiving this signal the vehicle extends one or more of its extendable bumpers.

Pedestrians

Collisions with pedestrians do not impart the same forces as collisions with heavier objects, such as a second vehicle. A collision with a pedestrian will generally decelerate a vehicle less than a collision with a heavier object. However, the much greater mass of a common vehicle, such as an automobile, can accelerate a pedestrian causing damage and/or death to the pedestrian. In an embodiment of the invention, the vehicle with extendable bumpers extends its bumpers in the event of a collision with a pedestrian. In this embodiment, a perception system identifies that collision is possible with a pedestrian or another object that is significantly lighter than the vehicle, such as a dog, and lowers the spring and/or damping forces in the extendable bumper assembly.

In an aspect of the embodiment, lowering of these forces will accelerate (or decelerate the lighter object if it is moving towards the vehicle) less, thus imparting lower harmful forces to the lighter object (and/or heavier object).

In an embodiment, and method of the embodiment, a perception system determines a likely collision and determines or estimates that the collision is with an object that is significantly lighter than the vehicle.

In an embodiment, a perception system determines a collision is likely and determines an estimated mass (or weight) of the object corresponding to the size of the object.

In an embodiment, a perception system determines a likely collision and determines that the collision is with an object from a list of alternative objects comprising a pedestrian, pet, or other living object.

Considerations and Responses

In an embodiment of the invention, a vehicle with a perception system determines a likely collision and estimates the weight or mass of an object and the speed or velocity of the possible impact between the vehicle and the object.

In an embodiment, and method of the embodiment, a perception system determines a likely collision and determines an estimate and ranks or compares estimated damage to the vehicle, passengers, and/or cargo to estimated, or otherwise determines estimated damage to the colliding object. In an embodiment, the vehicle determines and/or changes a value of an extendable bumper comprising one or more of a spring force, damping force, extension length, pressure, time to release pressurized gas, current flow, resistance, charge, and/or other response of the extendable bumpers of the vehicle to minimize possible damage and/or forces imparted in the collision to one or more of the colliding objects, or to minimize the overall damage to both colliding objects. In an embodiment, the vehicle determines and/or changes a spring, damping, extension length, and/or other response of the extendable bumpers of the vehicle corresponding to determined or estimated values comprising speed, mass, type, or other values of the colliding objects. The type value comprises one or more of vehicle, pedestrians, buildings, bridges, or other object types with which the vehicle may collide. The lists given here are open-ended and may comprise other values. However, some embodiments of the invention may be limited to one or more of these alternative elements, or may exclude one or more of these elements.

The vehicle may also consider the angle of the colliding objects before, during, and/or after a possible collision in respect to gravity. For example, if the first vehicle is traveling downhill, a collision with a second parked vehicle of would result in greater acceleration of the second vehicle, and less deceleration of the first vehicle due to the effects of gravity. This can be taken into account in deciding parameters of the extendable bumpers. Further, a perception system, or a system that can determine vectors and other values indicating what part of an object will be struck can be taken into account. For example, if a first vehicle is traveling forward and is about to collide with the end of a second vehicle, the second vehicle will likely spin lowering some forces to its occupants, which are likely positioned near the center of mass of the vehicle. This can also be taken into account in determining values of extendable bumper(s).

The vehicle may also take into account whether the object or other vehicle that it may collide with has extendable bumpers and/or whether the bumpers will be extended at the estimated time of collision and/or whether the bumpers will collide with each other and decide and determine parameters and values for the extendable bumpers based on these factors. In an aspect of some of the embodiments of the invention, if a first vehicle collides with a second vehicle both comprising extendable bumpers, and the bumpers generally line up with each other, the impact forces imparted to both vehicles may be reduced compared to a first vehicle with extendable bumpers colliding with a second vehicle without extendable bumpers.

In an aspect of some of the embodiments of the invention, the height of the extended bumper may be varied corresponding to what the vehicle may collide with. Further, a vehicle may comprise a plurality of bumpers wherein the some of the bumpers may be extended for possible collisions with taller vehicles, and others may be extended for vehicles with lower bumpers. In an aspect of some of the embodiments of the invention, the bumper itself may extend vertically upon extension of the extendable bumper assembly to provide a greater range of height relative to the ground to handle colliding with vehicles with different bumper heights, such as a tall truck or a low car.

In an aspect of autonomous vehicles (AV) and semi-autonomous vehicles, these vehicles may have to assign relative values to multiple scenarios where avoiding a collision is not possible, and the AV must choose between collisions. For example, the AV may have to choose between colliding with a pedestrian, or steering into another object, such as a parked car.

In an aspect and advantage of some of the embodiments of the invention, an AV, or semi-autonomous vehicle equipped with extendable bumpers of some of the embodiments of the present invention may choose from scenarios with reduced probable damages. In an embodiment, the vehicle with extendable bumpers may utilize one or more of the previously stated determinations, estimations, and/or rankings to determine a best action, wherein the action comprises extending the vehicle's bumpers.

In the case of colliding with a pedestrian, a perception can determine if the collision is with a human, or animal, and rank accordingly.

In an embodiment, the size of a hole in the chamber of the extendable members is varied depending of the determination of an object and/or ranking of one or more objects. In an embodiment, one or more extra holes open to reduce impact forces. In an embodiment, one or more extra chambers are opened to increase the area within which gas, which may be air, is compressed to reduce impact forces. In an embodiment, one or more extra chambers are closed to decrease the area within which gas, which may be air, is compressed to reduce impact forces.

In an embodiment, the extendable bumper(s) are extended through compressed gas, which may be air, and the amount, time of release of the gas, and/or pressure of the gas that is released to extend the bumper(s) varies depending on determining or estimating damage and/or acceleration/deceleration rates and/or forces imparted to colliding objects and/or the type and/or ranking of the colliding objects. In an aspect of some of the embodiments of the invention, the spring and/or damping rates and reactions of any extendable bumpers of some of the embodiments of the present invention may vary depending on these determinations, estimations, and/or rankings. For example, and in an embodiment, the embodiment that uses current (which may comprise induced current) for spring and/or damping forces and reaction may connect or disconnect coil windings and/or other electronic components to vary the forces and/or reactions of the extendable bumper assemblies to reduce estimated or determined damages.

User Interface

In an aspect of some of the embodiments of the invention, certain embodiments and methods of the invention comprise actions and behavior that may be user configurable. For example, the extendable bumpers can be deactivated in certain circumstances, such as off-road driving where a very rough road may cause inadvertent extension. Or the user may want to full power off the vehicle for long term storage. Variables, values, and actions may be configurable by a user by means of a user interface which may comprise common means of changing user settings, such as a touch screen or button interface.

In an aspect of some of the embodiments of the invention, the driver can be alerted to states of the extendable bumpers of the vehicle. For example, if a driver is parking a vehicle and extendable bumpers of the vehicle are extended, the driver may be warned. Otherwise, the driver may not account for the increased length.

Summary, Ramifications, and Scope

The embodiments, methods, examples, and aspects of the embodiments and invention are disclosed herein to summarize the invention and are not intended to limit the scope of the invention.

The present disclosure generally relates to using extendable bumpers to reduce the forces acting upon the occupants and/or cargo of a transportation vehicle. In some collision events, some embodiments of the present invention also reduce forces acting upon the occupants and/or cargo of a transportation vehicle with which the vehicle comprising the extendable bumpers collides. An object of the invention is to significantly reduce harm and damage to occupants, cargo, and/or the vehicle itself in many collision event.

The disclosed extendable bumpers reduce or eliminate the deficiencies and other problems associated with external airbags and common bumpers, as listed above. It is an object of some embodiments of the invention to reduce impact forces in comparison with common bumpers. In many collision or possible collision events, some of the extendable bumper embodiments are retractable and/or reusable where an external airbag would not be.

Further, some of the embodiments of the invention disclose bumpers that extend if a collision event is likely. This avoids some undesirable effects of having the bumpers extended at other times.

Many of the disclosed embodiments behave in a manner desired by the user or owner of the transportation vehicle. Accordingly, the reader will see that extendable bumpers are a preferred solution for safety.

The disclosure of the present invention as well as any references to preferred embodiments and other embodiments, are not for limiting the scope of the invention. Persons having ordinary skill in the art may make various modifications and changes without departing from the scope and spirit of the invention. Therefore, the scope of the appended claims should not be limited to the description of the embodiments described above. Accordingly, the scope should be determined not by the embodiments illustrated, but by the claims and their legal equivalents.

The invention claimed is:

1. An extendable bumper system for a vehicle, the system comprising: one or more rigid or semi-rigid bumpers attached to one or more extendable members comprising an extendable bumper assembly, wherein the extendable bumper system comprises a plurality of states comprising extended and retracted, wherein in the extended state the extendable members substantially extend the bumper outward from a body of the vehicle, and wherein the extendable members substantially extend the bumper outward in a response to an event that indicates that a collision with an external object is likely; the system further comprising one or more chambers, wherein the extendable bumper system does not comprise airbags, and is reusable; at least one of the chambers is filled with a fluid during extension; the system further comprising a gas providing a spring force during compression; and the system further comprising a fluid for the purpose of damping, and one or more springs for the use of retracting the extendable bumper system from its extended state in the event that a collision did not recompress the system to its retracted state.

2. The extendable bumper system of claim 1, wherein the extendable bumpers extend outward from the sides of the vehicle.

3. The extendable bumper system of claim 1, wherein the extendable bumpers extend outward and upwards from the roof of the vehicle.

4. The extendable bumper system of claim 1, wherein the event indicating a collision is determined by a perception system.

5. The extendable bumper system of claim 1, wherein the extendable bumper system comprises one or more sliders and one or more stanchions.

6. The extendable bumper system of claim 5, wherein at least one of the stanchions comprise one or more chambers containing a gas.

7. The extendable bumper system of claim 6, wherein the slider comprises a piston for the use of compressing the gas comprised within one of the chambers.

8. The extendable bumper system of claim 7, wherein the piston compresses the gas through a hole in one of the chambers or around the piston;
whereby damping is provided that prevents an assembly of one of the sliders and one of the stanchions from rebounding with a full force.

9. The extendable bumper system of claim 7, wherein the slider extends upon deceleration of the vehicle.

10. The extendable bumper system of claim 9, wherein a valve comprised within one of the chambers opens or remains open to allow a gas to enter during the extension of the slider.

11. The extendable bumper system of claim 10, wherein upon collision with an external object, the piston changes a pressure of the gas in one of the chambers, which causes the valve to close.

12. The extendable bumper system of claim 7, wherein one of the chambers is attached to a tank and a tank valve; wherein the tank comprises compressed gas; wherein the opening of the tank valve will send some compressed gas to the chamber causing the extendable bumper assembly to extend outward from the vehicle.

13. The extendable bumper system of claim 12, wherein a perception system comprises some sensors and a computing device; wherein the computing device determines that a collision with an external object is likely and sends some signals to the tank valve to open.

14. The extendable bumper system of claim 6, further comprising one or more hoses; wherein the hoses are attached to one or more of the chambers;
wherein some of the gas in one or more of the chambers is compressed moving forced gas through one or more of the hoses to one or more other chambers; wherein the compressed gas supplied from the hoses causes one or more of the extendable bumpers to extend; whereby an extendable bumper at one end or side of the vehicle may extend another extendable bumper at an opposite end or side of the vehicle.

15. The extendable bumper system of claim 1, further comprising one or more computing devices.

16. A vehicle implemented method comprising an extendable bumper system for reducing forces resulting from a collision with an external object comprising:
 a. detecting an event that indicates that a collision with an external object is likely;
 b. substantially extending one or more extendable bumpers outward from the vehicle upon detecting the event;
 c. filling one or more chambers with a fluid during extension of the bumpers;
 d. providing a spring force and a damping force; wherein the system further comprising a gas providing the spring force during compression; and the system further comprising some fluid for the purpose of providing the damping force;
wherein the system comprises one or more springs for the use of retracting the extendable bumper system from its extended state in the event that a collision did not recompress the system to a retracted state: wherein the extendable bumper system does not comprise airbags, and is reusable; whereby, the extendable bumpers provide a substantially greater distance with which to reduce an impact force than does a non-extendable bumper of the same length as an un-extended extendable bumper.

17. The method of claim 16, wherein the extendable bumpers extend in response to a deceleration force.

18. The method of claim 16 wherein the vehicle comprises a perception system; and the method further comprising the perception system detecting a possible collision, whereby the vehicle extends the extendable bumpers in response to the detection of a possible collision.

19. The method of claim 16 wherein the vehicle comprises a communications system, wherein the communications system communicates with an object external to the vehicle; and the method further comprising the communications system detecting a signal to extend the extendable bumpers or a signal to brake the vehicle, whereby the vehicle extends the extendable bumpers in response to the detection of the signal to extend or the signal to brake.

20. The method of claim 19, wherein the signal to extend or the signal to brake comes from a source outside of the vehicle.

21. The method of claim 19, further comprising responding to at least one signal from the communications system to retract one or more of the extendable bumpers.

22. The extendable bumper system of claim 4, further comprising one or more wireless communication chips and one or more wireless protocols.

23. The extendable bumper system of claim 4, wherein the bumper system determines and changes a value of an extendable bumper to minimize possible damage and/or forces imparted in a collision to one or more of the colliding objects, wherein the value comprises at least one value of a spring force, a damping force, an extension length, or a time to release pressurized gas.

24. The extendable bumper system of claim 4, wherein the perception system comprising one or more accelerometers and one or more gyroscopes.

25. The extendable bumper system of claim 4 wherein the perception system comprising a GPS.

* * * * *